United States Patent [19]

Katzeff

[11] Patent Number: 5,101,491

[45] Date of Patent: Mar. 31, 1992

[54] SYSTEM MEANS FOR SYNTHESIZING, GENERATING AND CHECKING SOFTWARE FOR A COMPUTER

[76] Inventor: Kurt Katzeff, Televerkets Huvudkontor, Fack, S-123 86 Farsta, Sweden

[21] Appl. No.: 146,672

[22] Filed: Jan. 21, 1988

Related U.S. Application Data

[63] Continuation-in-part of Ser. No. 929,031, Nov. 10, 1986, abandoned, which is a continuation of Ser. No. 642,165, Aug. 20, 1984, abandoned.

[30] Foreign Application Priority Data

Aug. 19, 1983 [SE] Sweden .................. 8304501

[51] Int. Cl.$^5$ .............. G06F 9/64; G06F 9/455; G06F 15/16
[52] U.S. Cl. ............... 395/500; 364/275.6; 364/282.1; 364/917.96; 364/DIG. 1
[58] Field of Search ... 364/200 MS File, 900 MS File

[56] References Cited

U.S. PATENT DOCUMENTS

| | | | |
|---|---|---|---|
| 3,930,237 | 12/1975 | Villers | 364/300 |
| 4,204,253 | 5/1980 | van den Hanenberg et al. | 364/200 |
| 4,205,371 | 5/1980 | Feather | 364/200 |
| 4,231,087 | 10/1980 | Hunsberger et al. | 364/200 |
| 4,315,315 | 2/1982 | Kossiakoff | 364/300 |
| 4,437,184 | 3/1984 | Cork et al. | 371/19 |
| 4,500,963 | 2/1985 | Smith et al. | 364/320 |
| 4,536,840 | 8/1955 | Borta | 364/300 |
| 4,580,228 | 4/1986 | Noto | 364/300 |
| 4,631,664 | 12/1986 | Bachman | 364/200 |
| 4,635,189 | 1/1987 | Kendall | 364/200 |
| 4,734,854 | 3/1988 | Afshar | 364/200 |
| 4,734,856 | 3/1988 | Davis | 364/300 |

FOREIGN PATENT DOCUMENTS

0116694 8/1084 European Pat. Off. .
0172980 3/1986 European Pat. Off. .

OTHER PUBLICATIONS

Busnello et al., "Structure of a Source Program Generator", IBM TOB vol. 14, No. 1, pp. 306–311.
Wisniewski, "Aids for VLSI Design Entry and Partitioning", IEEE International Conference on Circuits and Computers, IEEE, 1982.
Waters, R. C., "The Programmer's Apprentice: Knowledge Based Program Editing", *IEEE Transactions on Software Engineering*, vol. SE-8, No. 1, Jan. 1982.
Dell et al., "Computer-Aided Design for Software", *Software and Microsystems*, vol. 1, No. 1, Oct. 1981.

*Primary Examiner*—Thomas C. Lee
*Assistant Examiner*—Ayni Mohamed
*Attorney, Agent, or Firm*—Pollock, Vande Sande & Priddy

[57] ABSTRACT

A synthesizer means for generating software for a computer which is programmed for controlling a physical system. The software generated by the synthesizer represents a new function to be incorporated in the existing system. The synthesizer includes a device for receiving a formal description representative of the new function in a specification language and for translating the specification into a base document. The base document is further processed by document processing devices for handling the static, interface and dynamic parts of the description to produce an error-free base document. The complete base document is translated by an information processing device into an internal code document which is used by a check device and a simulation device. A compiling device translates the internal code document into an intermediate code document suitable for input to said computer.

6 Claims, 29 Drawing Sheets

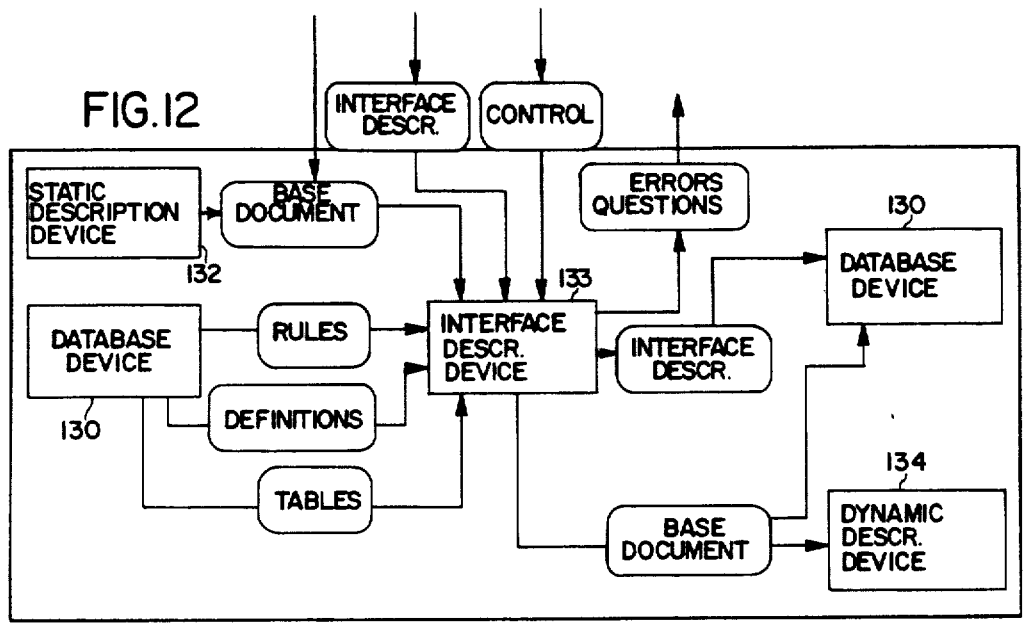
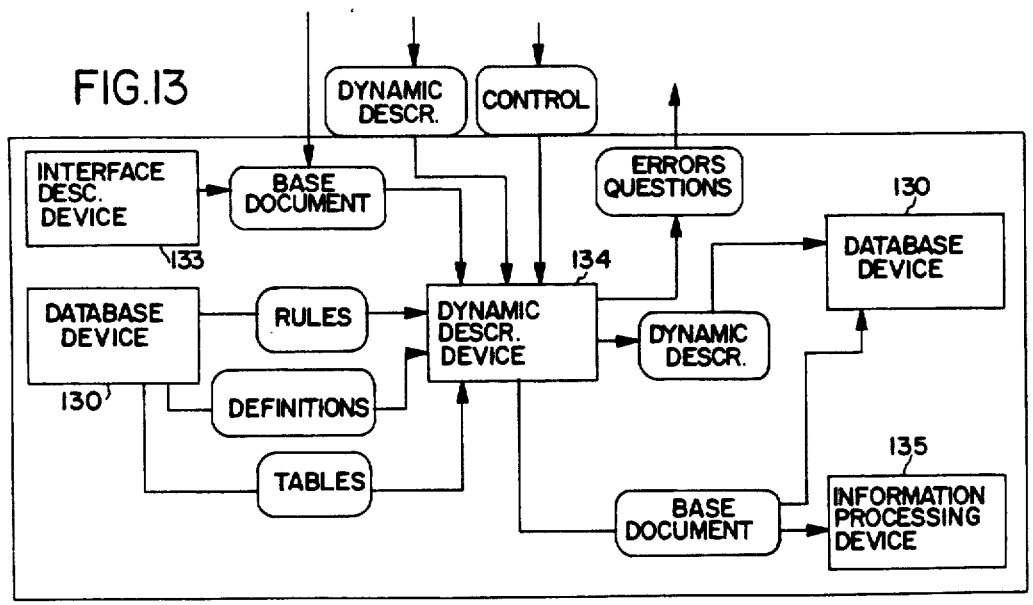

SYSTEM MEANS FOR SYNTHESIZING, GENERATING AND CHECKING SOFTWARE FOR A COMPUTER

This application is a continuation in part of application Ser. No. 06/929,031, filed Nov. 10, 1986, now abandoned, which is also a continuation of application Ser. No. 06/642,165, filed Aug. 20, 1984, now abandoned.

FIELD OF THE INVENTION

This invention relates to a means for, from an abstract specification and a description of a system, synthesizing, generating and checking new software that may be inserted in the program memory of a computer.

The invention is applicable on software generation in general. However, the invention is specifically advantageous in applications where it is necessary to coordinate between the software program executed by the computer and the physical environment interacting with the computer, such as electronic circuits or electromechanical devices. The invention is specially suited for software generation in relation to real-time systems such as a telephone exchange system being controlled by a computer having a program stored in a memory thereof, such as stored-program-controlled telephone exchanges.

An exemple of such an automatic telephone exchange system contemplated by the present invention is the digital telephone exchange system AXE 10 jointly developed by Televerket and Telefon AB LM Ericsson.

DESCRIPTION OF THE RELATED ART

Techniques for writing software have included writing in a certain programming language. There are several medium- and high level languages developed for different tasks, such as PLEX, CHILL, Pascal and ADA. Furtermore, various computer-based tools have been developed for assisting the software developer, such as editors, emulators, simulators etc.

In SOFTWARE and MICROSYSTEMS, Vol. 1, No. 1, October 1981, there is published an article "Computer-aided design for software" by P. W. Dell et al, which discloses the development of a CADOS system, i.e. a system for computer-aided design of software. The key element of this system is a graphical language called SX1. It is based on flowcharts. It provides sophisticated computer-aided facilities for the production of such charts and at the same time automatically translates the documents into high-level source code. The system uses an interactive graphics technique so that the software engineer may "draw" his programs on the screen of a visual display unit VDU. The simulation of a program at chart level is projected.

In IEEE TRANSACTIONS ON SOFTWARE ENGINEERING, Vol. SE-8, No. 1, January 1982, there is published an article "The Programmer's Apprentice: Knowledge Based Program Editing" by R. C. Waters, which discloses an interactive programming assistant system called PA. The PA is based on the underlying philosophy that there is a fundamental division of labor between the programmer and the PA. The PA assists in keeping track of details, debugging, and modification of program, while the programmer do the really hard parts of the design and implementation. The PA system is composed of five modules, viz. an analyzer module, a coder module, a drawer module, a library and a plan editor. The PA system does not operate on program text but on a plan. Given the text for a piece of a program, the analyzer module can construct a plan corresponding to it. The coder module performs the reverse transformation, creating program text corresponding to a plan. The drawer module can draw a graphical representation of the plan. The library contains common program fragments represented as plans. The plan editor makes it possible for the programmer to modify a program by modifying its plan. A plan is like a flow-chart but data flow and control flow is represented by explicit arcs. The whole system, except for parts of the coder and analyzer modules, is essentially programming language independent.

In U.S. Pat. No. 4,231,087 issued to Hunsberger et al, there is disclosed a microprocessor support system for developing and testing application software as well as for debugging the microprocessor-based application machine itself. The microprocessor support system contains a centrally located time-shared minicomputer equipped with a full complement of peripherals which function as the main part or operating system. The time-shared minicomputer is provided with a data link, which enables the operating system to communicate with test equipment located at the site of the application system. This remotely located test equipment consists of a field test unit FTU which interfaces to the time-shared minicomputer via a data link, to a local keyboard terminal, and to the application system. Thus, an engineer at the application system has access, through the field test unit, to both the application system and the time-shared minicomputer operating system with its sophisticated operating system and hardware resources to assist him in developing and testing the application software as well as in debugging the application system hardware. The disclosed field test unit contains a microprocessor, transfer trace, matcher, elapsed time clock, and mimic memory hardware and software debugging aids. The field test unit can receive new or modified application software from the operating system or can retrieve and modify the application software from the application system itself. Also, the application system can be run under normal operating conditions or the field test unit can cause the application microprocessor to execute new application software stored in the field test unit's common memory. This enables the engineer to modify the application software external to the application system, and then run the application system with the modified software, observing the results, before altering the application system memory.

SUMMARY OF THE INVENTION

The above-mentioned prior art has concentrated on aiding the programmer in doing his programming in essentially the conventional way.

The basic object of the present invention is to provide means for generating new software from a specification of a new or amended function, which is to be included in a system, especially a telephone exchange controlled by a stored program. The new software is a new version of the stored program and includes the new function.

Another object of the invention is to provide an output from the means suitable as input to a construction device for constructing hardware, if the hardware of the existing system is not capable of performing the new function.

The above objects are achieved by a means comprising: a database device that performs storage operations and includes memory areas for global information and areas for information relating to the specific system only; an information generator that transforms a formal description representative of the supplementary instruction in a specification language into a base document, and sends said base document to the database device; a static description device that extracts parts of the base document to generate a specific static description, the extracted parts of the base document being replaced by references to the static description, and sends the updated base document to the database device; an interface description device that extracts parts of the base document to generate an interface description, the extracted parts of the base document being replaced by references to the interface description, and sends the updated base document to the data base device; a dynamic description device that extracts dynamic parts of the base document to generate a dynamic description, the extracted parts of the base document being replaced by references to the dynamic description, and sends the updated base document to the database device; an information processing device that processes the base document updated by the static, interface, and dynamic description devices, respectively, to generate an internal code document containing all information needed to generate the new software, and sends the internal code document to the database device; a check device that verifies the internal code document in a semantic and syntactical sense; and a compiling device that translates the internal code document into a desired language, thereby generating an intermediate code document constituting said software for input to said computer.

Advantageously, the means further comprises a simulation device for simulating the system using the internal code document generated by the information processing device and checked by the check device, whereby errors are noted and reported to the environment and the internal code document is updated.

A preferred embodiment of the invention further comprises a documentation device for generating information on the contents of the database device in a desired format, whereby the documentation device can provide information suitable for creation of haradware.

BRIEF DESCRIPTION OF THE DRAWINGS

The invention is described in more details hereinafter with reference to the appended drawings.

FIGS. 10–17 are diagrams of the information flow of the respective devices of the invention.

DETAILED DESCRIPTION

Figure 1:
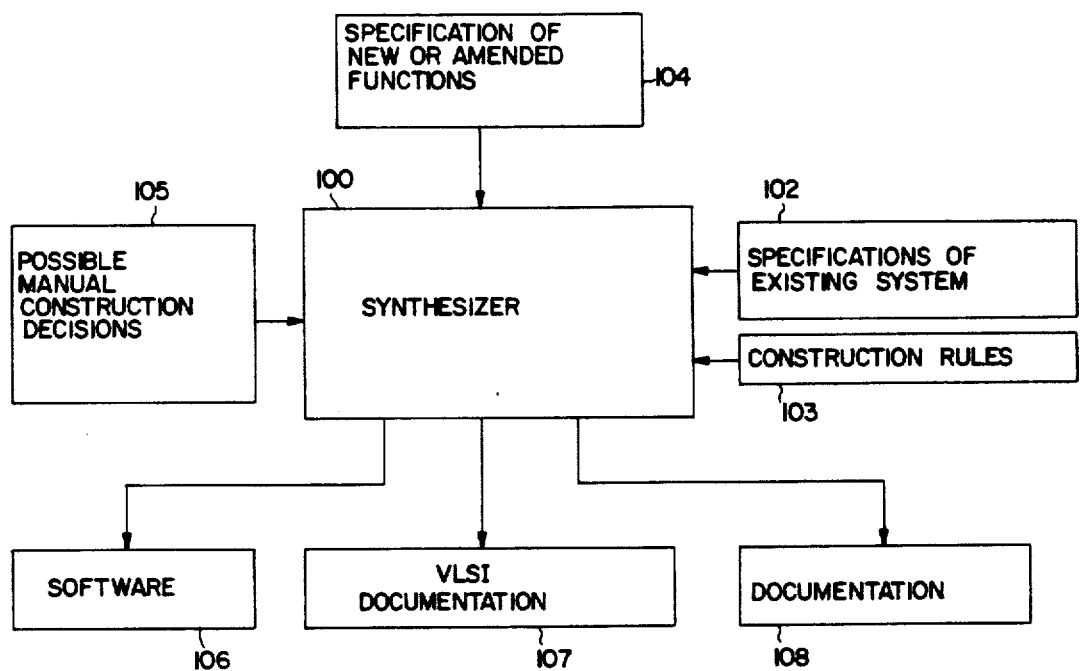
FIG. 1 is a schematic block diagram of the means according to the present invention.

In FIG. 1, the means according to the present invention is schematically disclosed. A block 100 labelled SYNTHESIZER receives specifications of all functions in an existing system 102 and the construction rules 103 valid for the system.

To the synthesizer 100 there is input specifications for new functions 104 to be added to the system or specifications of functions to be amended or deleted from the system.

The specifications are made on an abstract functional level, e.g. in the language CCITT-SDL, which is a Specification and Description Language recommended by CCITT (Consultative Committee on International Telephone and Telegraph). The idea of making the specifications on an abstract functional level is that the functional specification will be independent of the present application, which means that it can be reused for another system by changing the database for the specifications and rules in the SYNTHESIZER 100.

When operating on the specification input to the SYNTHESIZER 100, it might be necessary to make certain decisions manually as indicated at 105. Such decisions necessitating manual intervention are such decisions not covered by the rules in the SYNTHESIZER 100, e.g. if the function should be implemented in software or hardware.

On request, the SYNTHESIZER 100 outputs the completed function constructed as software 106 and/or information for constructing hardware 107 (VLSI) and the documentation 108 thereof.

This method of generating software and/or hardware has several advantages over prior art methods.

1) The construction operation between completed specification and the production documents is made automatically.

2) The construction is made with formal specifications at a normal specification level.

3) The construction is independent of the actual implementation technique-software-hardware.

4) The construction is reusable.

5) The products are automatically verified with updated specifications.

6) Formal analyses and simulations at the specification level are possible.

Figure 2:
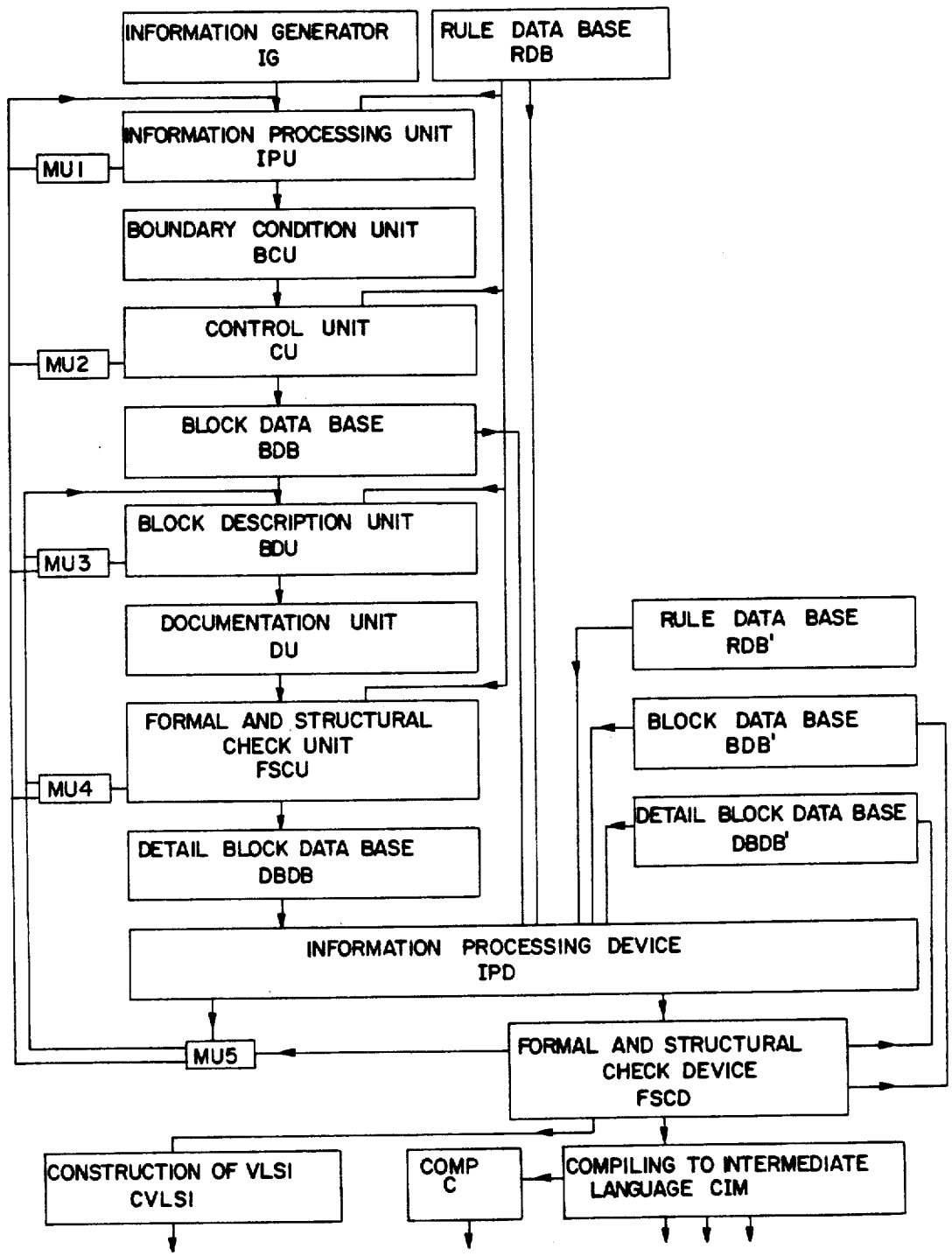
FIG. 2 is a flow chart of the steps according to the invention.

In FIG. 2, a general flow chart of the operation of the present invention is disclosed. The synthesizer according to the invention, generate software to be inserted in the program memory of a computer and hardware specifications if necessary.

The flow chart according to FIG. 2 will be described in connection with a stored-program-controlled telephone exchange but it is believed that the invention can be used in many other applications.

The exchange is described by a set of requirements in a so called requirement specification.

By means of an information generator, IG, information coded according to the specification is produced. The information generator can be designed to work with SDL information input by means of a terminal, by an opto-reader reading a paper comprising the specification, by inputting the information from another computer by a communication link or other similar input means. The information is then coded to a format suitable for the further work according to this invention.

Thus, the basic specification of a new function to be generated is input to the information generator IG and transferred to a suitable format or code.

There is also provided another input device labeled RDB which is a rule data base comprising rules, definitions and tables relating to the use of the language and constructional rules, definitions and tables relating to the overall system. Said rules, definitions and tables are input by any of the means mentioned above.

The information in IG and the rules, definitions and tables in RDB are transferred to an information processing unit IPU. In IPU, a base document is generated by processing the information from IG according to the rules, definitions and tables from RDB.

The base document comprises the information received from IG and processed according to the rules, definitions and tables received from RDB. The information is divided into several operation blocks or modules, which gives a more detailed description of the specification compared to the information contained in the base specification of the information generator IG.

The base document can be displayed to the user and if the base document does not suit the user for any reason, he can input further information or rearrangements by a manual unit MU1, as for example change the block division suggested by IPU.

The information received from IG may further be insufficient for being processed by IPU for any reason. Then, further information may be input by MU1.

The unit IPU can in certain cases suggest one or several choices to be followed by the manual intervener.

Furthermore, a check is made by IPU to ensure that the base document is consistent with the information received from IG. If not, a manual intervention is made by the manual unit MU1.

If a manual intervention is made by MU1, the processing in IPU is repeated until no further manual intervention is necessary or desired.

The base document is a systematic description of the information received from IG according to the rules received from RDB in block level in a given code.

The information in the base document is transferred to a boundary condition unit BCU, wherein the boundary conditions such as interfaces between the various blocks are defined.

The information from unit BCU is transferred to a check unit CU, wherein the information is checked so that it does not deviate from the rules, definitions and tables of the rule data base RBD. If an error is detected, a manual intervention is made by manual unit MU2 and the processing is repeated from IPU.

After being formally approved by check unit CU, the block description of the new function is input into a block data base BDB for the local application system and stored. In the block data base it is noted that the new function is still not included in the overall system.

The information of the block description stored in the block data base BDB is transferred to a detail block description unit BDU, in which the blocks are described in further details according to the rules, definitions and tables received from RDB.

If the rules, definitions and tables in RDB are not sufficient for automatically carrying out said detail block description or if there are a number of equally valid detail solutions, it might be necessary with manual intervention via manual unit MU3. Such manually made design decisions are documented and regarded as a part of the coded description in the information generator IG.

When further manual intervention is not required or desired, the information is transferred to a documentation unit DU. The information transferred is a complete detail block description of the interfaces and cooperation between the internal processes in each block.

The detail block description in DU is checked formally and structurally in a formal and structural check unit FSCU so that it is not in conflict with the rules, definitions and tables of RDB. The formal check can be that the program lines are syntatically correct and the structural check can be a check that the interface requirements are met. Any discrepancies are altered automatically by FSCU. Interfaces inside each block are also checked and altered automatically. For this check, the formal and structural check unit has access to all information stored in the block data base BDB. A simulation is also made for checking the dynamic behaviour of the detail block description by means of the information stored in BDB.

If such alterations cannot be made without manual intervention such manual intervention is possible via manual unit MU4. Depending on the nature of the manual intervention it may be necessary to make alterations in the detail description in detail block description unit BDU or in the base document of the information processing unit IPU. In such cases, the process must be restarted from said units. If so, all new information will be documented in the block data base BDB or the documentation unit DU. The manual intervention is continued until no further manual intervention is necessary or desired.

The detailed block description now checked and approved in the formal and structural check unit FSCU is transferred to a detail block data base DBDB where it is stored. It is noted that the detailed block description has not been integrated in the overall system.

In a rule data base RDB' there is input rules, definitions and tables relating to the particular system in which the new function is to be installed. The particular system has its own rules, definitions and tables which are limitations or rather clarifications of the rules, definitions and tables input in the rules data base RDB of the overall system.

In a block data base BDB', there is input a description of the particular system at block level.

In a detail block data base DBDB' there is input a description of the functions the particular system can carry out.

These three data bases of the particular system comprises the same type of information as the correspondingly labelled data bases of the overall system, and describes all the functions the particular system already is able to carry out and have implemented in the software and hardware. Thus, such information is a complete description of the particular system before the implementation of the new function. Such description includes system structure and hardware properties and all the functions which has already been created for the particular system and interfaces and cooperation requirements.

The information in these three data bases are input into the data bases in the same way as described in connection with the information generator IG. Usually, such information is stored in a computer-readable form and can be directly input to the data bases by a communication link.

The information of the three data bases of the overall system and the three data bases of the particular system are input to an information processing device IPD. The new function to be generated is input to IPD from data base DBDB. The detailed block description is compared with the information stored in data bases RDB', BDB' and DBDB' and the new information which must be input into the particular system is determined.

The information processing device IPD calculates the information and/or the instructions which must be input to the program memory of the automatic telephone exchange for having said exchange to operate according to the new and old specification.

It might be necessary to have manual intervention which is carried out by manual unit MU5. Thus, new information must possibly be introduced in the information processing unit IPU or the block description unit BDU and the process according to the invention is restarted from said units.

A formal and structural check is made in a formal and structural check device FSCD. An automatic alteration is made, if possible. The interface requirements are also checked and/or a simulation takes plase for checking the dynamic behaviour.

This checking procedure is made independent of the processing in IPD and checks that the result from IPD satisfies the formal requirements in RDB and RDB', the structural requirements in BDB and BDB' and the interface requirements in DBDB and DBDB'.

The checking procedure can result in the need of manual intervention, which takes place via manual unit MU5 as described above.

After the simulation and checking in FSCD is free from errors and approved, the new function is available in the data base DBDB'.

The differences or amendments necessary in the particular system for adding the new function is transferred to a compiling unit CIM for compiling to an intermediate language, for which compilers to a machine code exist, such as PLEX, CHILL, Pascal and ADA. Compiling to the required machine code specific for the particular system takes place in compiler C. This is a trivial compilation of all the programs in the system via the compiler C to the required machine code. The complete machine code for the program memory of the exchange is compiled in compiler C.

It might be necessary or desired to add new hardware to the particular system and such new hardware is specified in a device CVLSI for construction of VLSI for subsequent transmission to an automatic construction device for VLSI circuits.

The data bases BDB' and DBDB' may be updated by device FSCD to include the new function in terms of software and hardware. In this way it is possible to check how the particular system will behave after the inclusion of the new function.

The general flow chart described above is in many ways simplified and incomplete in order to provide a general understanding of the concept underlying the present invention. For practical reasons, many of the boxes of the flow chart are combined in an actual embodiment of the invention, but, on the other hand, some boxes are split into more than one "device" of the embodiment. Furthermore, some boxes do not have a physical counterpart, e.g. the check unit CU, since the check is inherent in using the specified control language and applying rules, definitions and tables.

DESCRIPTION OF A PREFERRED EMBODIMENT OF THE INVENTION

The invention will now be described by way of example of a presently preferred embodiment of the invention.

As shown in FIG. 1, the invention is a device 100 into which a specification is input and a software in the form of intermediate code is produced. The invention could create new functions, in parts or as a whole, or software that is an amended version of something already existing, in parts or as a whole. The invention is capable of generating output suitable as a first input to another automatic construction device, dedicated to handle construction of hardware.

In addition to this main function, the invention supplies, through the devices used to fulfill the main function, various other possibilities, described in the more detailed parts of the description.

For the purpose of this description, the invention's work could be divided into three logic parts:

1. The work performed on documents, that is, work performed on information, by the environment thought of as documents. This is information used in communication between the environment and the invention;

2. The work performed on information, that is, the invention's internal work on complex information stored in the invention and not limited by the document boundaries but rather a free crossing of information stored in different areas, and conceptually belonging to a number of different documents. This type of information is not used in communication with the user of the invention;

3. The adaptation and translation of the logic, represented by the information held, to a world, specified by the environment, which is to receive the information, being a specification, for actual use in said environment, for the purpose of specifying the exact behavior of a computer. This is the information produced for the environment only. This information is not stored in the invention, but is produced on request by the invention for the environment.

Depending on the way the device is connected to the environment, it could perform automatic insertion of software in a machine or deliver a result usable for manually intervened further processing in the form of compiling, linking and insertion of the specific software in a computer.

Depending on the extent of rules and definitions, the insertion could be made in runtime or as a stop and start operation.

Depending on languages used, the output is not limited to a read/write memory environment, but could as well be directed to a read only environment.

Depending on the languages used for the invention, simulation could be carried out on different levels of abstraction, ensuring the reliability and generally termed "quality" of the software.

The invention can generate alarms related to restrictions in the hardware when related to the software produced, in such a way that initial information for VLSI or other hardware construction processes are easily obtained from the device in a number of formats specified by the environment, thus making it possible to use output from the device as a first input to other automatic construction devices.

Figure 3:
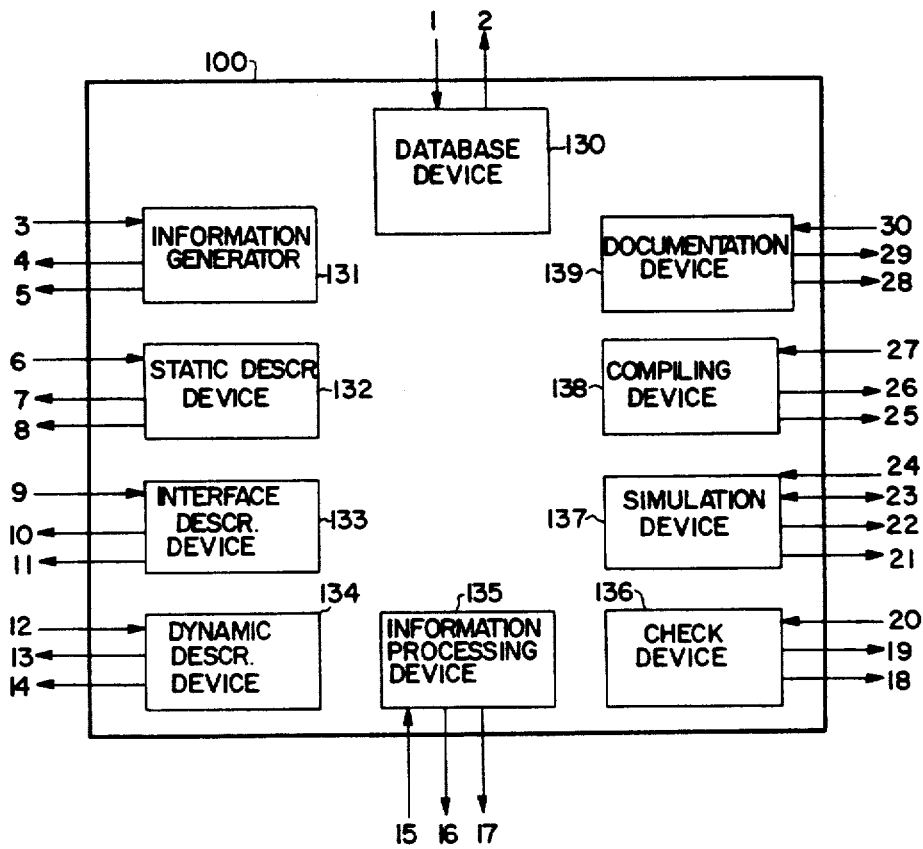
FIG. 3 is a block diagram of the devices constituting the present invention and their connections to the environment.

With reference to FIG. 3 the invention contains several devices to enable the function of the invention. These are:

The Database Device

The database device 130 is a device performing services in relation to storage, that is, storing, searching, updating, etc., information stored in areas.

The device 130 is divided into two main types of areas, a global area and a system specific area.

The global area exists in only one instance per instance of the device. This area is dedicated to the storage of global information, exemplified by rules, definitions and tables related to languages, machine descriptions in said form, etc., that is, information in principle applicable to all objects of construction.

System specific areas exist in one instance per defined system, as long as the space allows it. A system specific area is dedicated to the storage of information related to and valid only for one system, exemplified by specifications, static descriptions, interface descriptions, dynamic descriptions, etc.

The Information Generator

The information generator 131 performs translation from the specification language to the invention specific language, that is, represented in this description by translating the formal description to a base document.

The Static Description Device

The static description device 132 is dedicated to handle static description.

The Interface Description Device

The interface description device 133 is dedicated to handle interface descriptions.

The Dynamic Description Device

The dynamic description device 134 is dedicated to handle dynamic descriptions.

The Information Processing Device

The information processing device 135 handles the translation of a complete base document to an internal code document.

The Check Device

The check device 136 handles checking of internal code documents according to the rules, definitions and tables.

The Simulation Device

The simulation device 137 handles the simulation according to the environment's expressed will in command language or expressed in rules, definitions and tables.

The Compiler Device

The compiler 138 compiles an internal code document according to the environment's expressed will in command language or expressed in rules, definitions and tables, with the help of rules, definitions and tables.

The Document Device

The document device 139 is dedicated to connect the environment with the database device in a logical way, performing searches, extraction, listings, etc., using formats expressed by the environment in command language format or expressed in rules, definitions and tables.

CONNECTION DESCRIPTION

This part of the description has been divided into two parts for description purposes. One part describes the invention connectors available to the environment for connecting to the invention, the other part is a description of how the devices in the invention is connected internally.

Environment - Invention Connections

With reference to FIG. 3 the invention connectors to the environment are:
1. Input, control language.
2. Output, control language.
3. Input, control language, formal description, base document.
4. Output, formal description, base document.
5. Output, control language.
6. Input, base document, static description, control language.
7. Output, static description.
8. Output, control language.
9. Input, base document, interface description, control language.
10. Output, interface description.
11. Output, control language.
12. Input, base document, dynamic description, control language.
13. Output, dynamic description.
14. Output, control language.
15. Input, base document, internal code, control language.
16. Output, internal code.
17. Output, control language.
18. Output, internal code.
19. Output, control language.
20. Input, internal code, control language.
21. Output, signal.
22. Output, control language.
23. Bidirectional, signal.
24. Input, internal code, control language, signal.
25. Output, intermediate code.
26. Output, control language.
27. Input, internal code, control language.
28. Output, any information stored in database device, generated information.
29. Output, control language.
30. Input, control language.

Internal Connection Description

Figure 4:
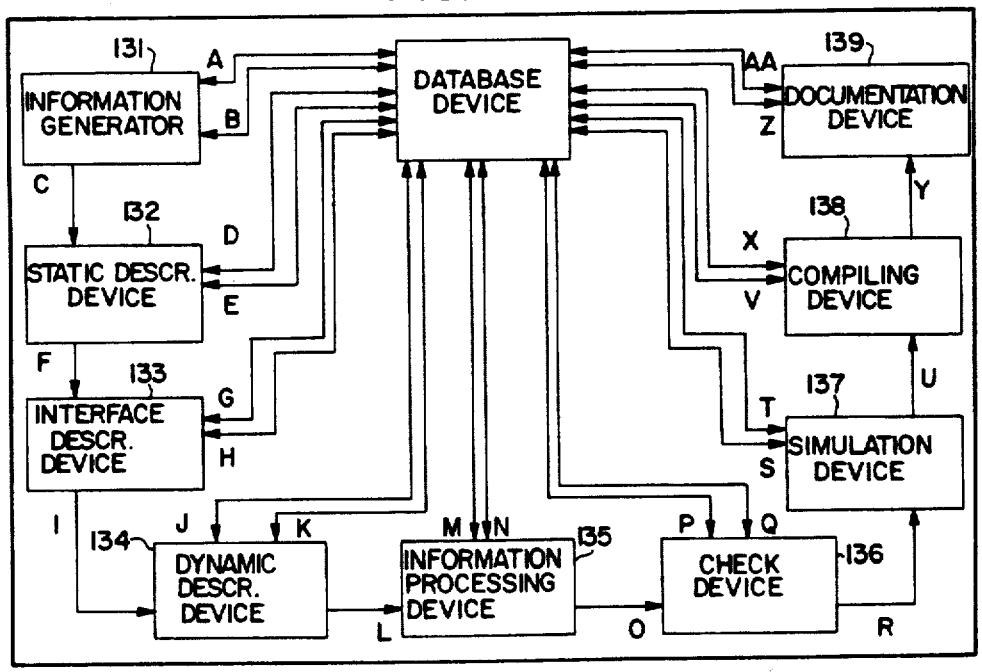
FIG. 4 is a diagram of the internal connections between the devices of the invention.

The invention connections between internal devices are shown in FIG. 4. The connectors, restricted to internal use only, are as follows:
A) Bidirectional, control language.
B) Bidirectional, information.
C) Output, base document.

D) Bidirectional, control langugage.
E) Bidirectional, information.
F) Output, base document.

G) Bidirectional, control language.
H) Bidirectional, information.
I) Output, base document.

J) Bidirectional, control language.

K) Bidirectional, information.
L) Output, base document.

M) Bidirectional, control language.
N) Bidirectional, information.
O) Output, internal code.

P) Bidirectional, control language.
Q) Bidirectional, information.
R) Output, internal code.

S) Bidirectional, control language.
T) Bidirectional, information.
U) Output, internal code.

V) Bidirectional, control language.
X) Bidirectional, information.
Y) Output, intermediate code.

Z) Bidirectional, control language.
AA) Bidirectional, information.

Examples of Connecting to the Invention

For obvious reasons, being an invention directed to handling telephone exchanges in the form of computing machines, most examples uses the machine world as the world of reference. There is, however, nothing at all to say that this has to be the case. The examples of how to connect to the invention are all assuming the use of computers.

The many connectors to the invention make the connecting possibilities very numerous. To exemplify, three in principle different ways are selected as examples of connections.

Figure 5:
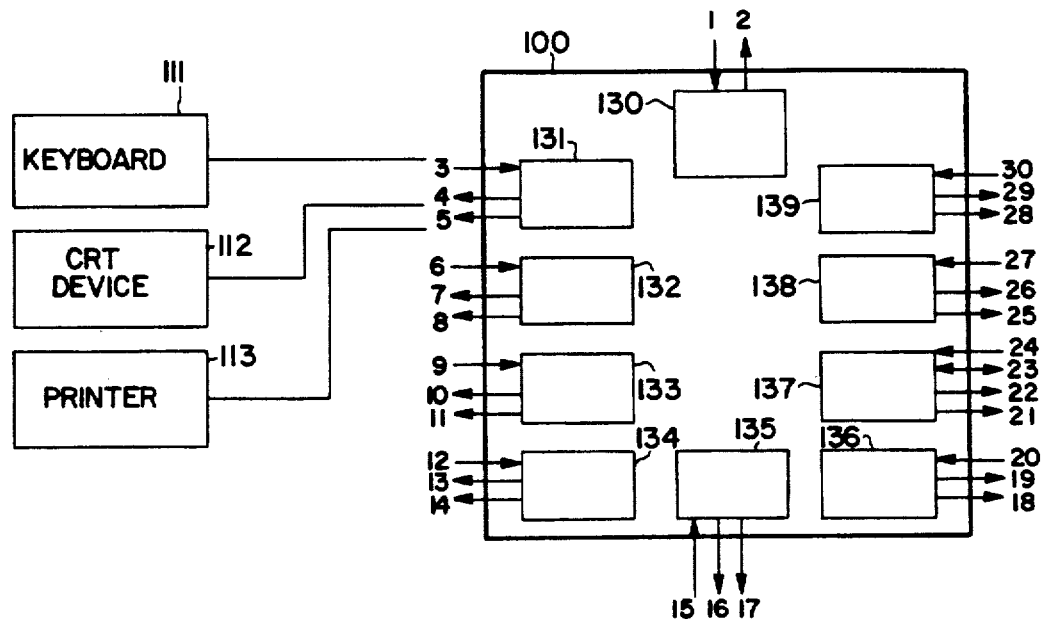
FIGS. 5–7 are diagrams showing examples of connecting the invention.

This first example shows in FIG. 5 one way of connecting to a set of connectors (a set being a complete connection to one device in the invention). In this example input to the device is submitted through the connection to a keyboard 111. Any control statements having as a result an output from the device (in this case the information generator) will be displayed on the CRT device 112. Any control messages from the device, like errors, questions and alternatives, would be output on the printer 113.

Figure 6:
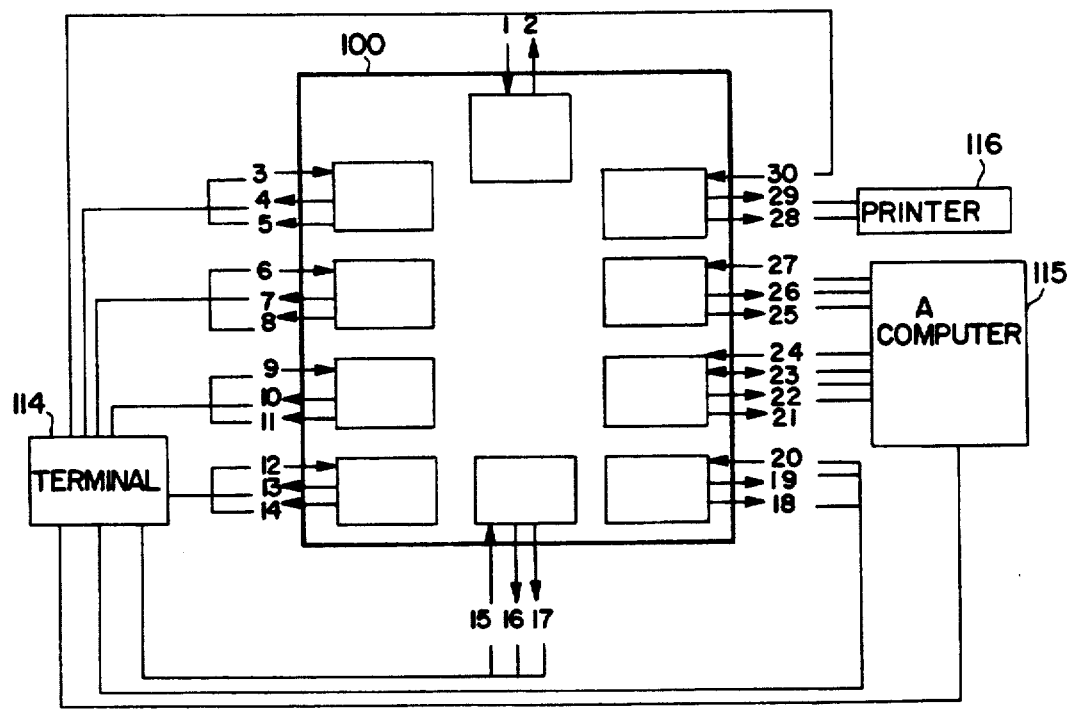

Keeping in mind the first example, that way of organizing one set of connectors is in FIG. 6 abbreviated to the word "terminal" 114. In this example such a terminal 114 is connected to the entire document processing part of the invention. It could in fact be one single terminal, but also one for each set of connectors, or any other number of terminals organized in a way that a user of the invention would find corresponding to the needs present at that user's environment.

The information processing is in the same way connected to a terminal, ending with the checking device process.

The simulation and compiling devices are connected to a computer 115, which in turn is also connected to a terminal 114, for example making it possible to check the behavior of that computer when the computer is influenced by the invention in simulation or in changing/adding software. The terminal 114 of the computer 115 is also used for further processing of the intermediate code placed in the computer by this invention.

Finally, the documentation device is connected for control input to a terminal 114, and the output is directed together with the control output from the device, to a printer 116 for documentation in a permanent form.

This example points out the possibilities to connect different devices in the environment to different connectors to achieve an interaction between the environment and the invention in a way that suits the using environment.

The scope of possibilities to use devices in the environment are so great that a list of the possibilities is impossible to make. Some suggestions could include:

OCR equipment, making it possible to transfer one carrying media into another when input is made to the information generator, thus making it possible to use old specifications.

Using personal computers in "smart handling" of the different documents or special editors, for example using graphical notation of a line oriented syntax on specification languages not supplied with a graphical syntax.

Using hardware probes at the simulation connectors, making it possible to simulate on a target machine, avoiding the classical problem of the measurement's influence on the measured process.

Using environment supplied functions connected to the database device control connectors to feed back rules derived by for example artificial intelligence from the invention produced results.

The third example is used to point out the principle of communication between entire instances of the invention.

Figure 7:
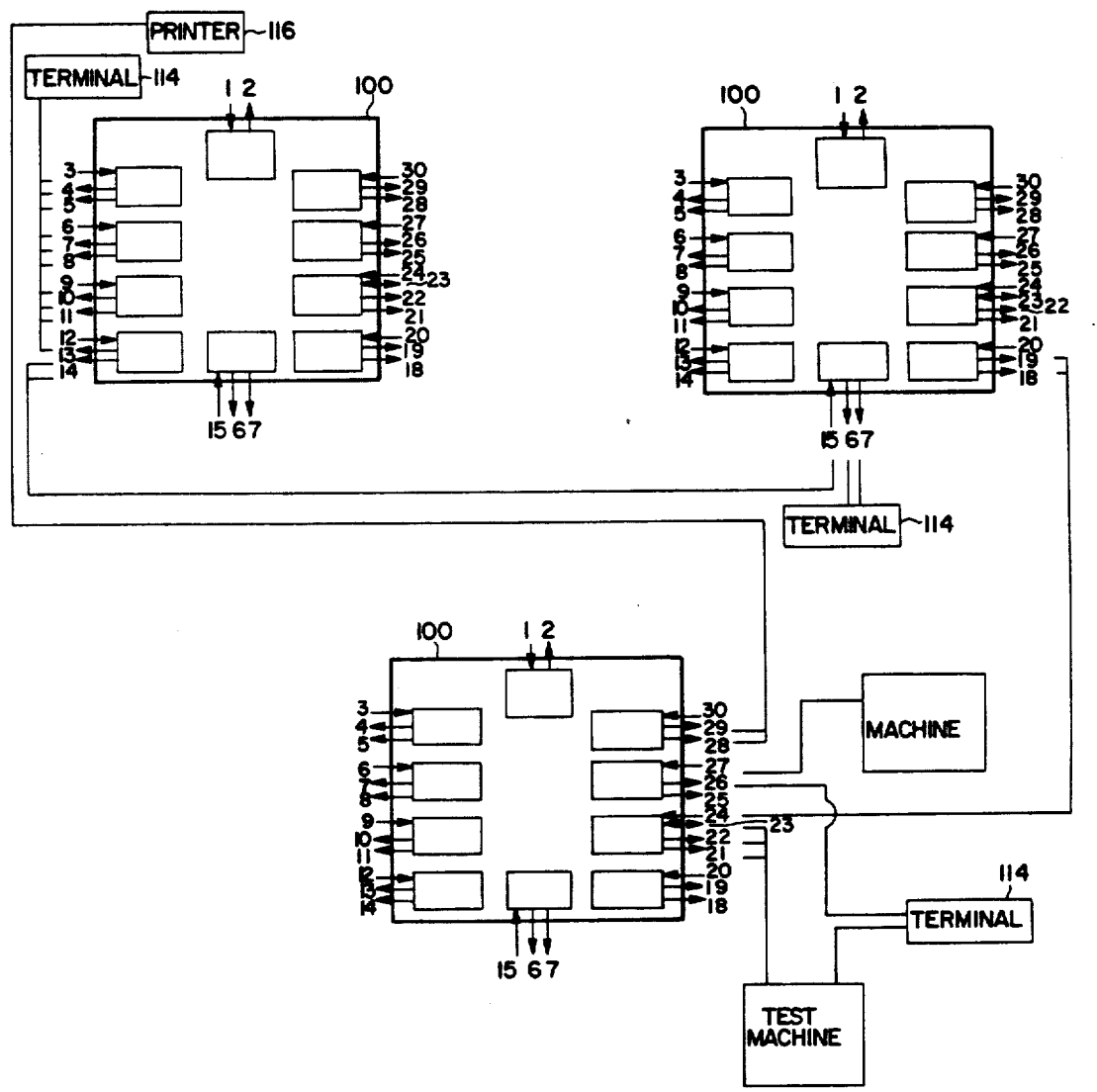

As shown in FIG. 7, there is naturally nothing to stop a using environment from connecting connectors of one instance of the invention with connectors of the other instance. The reasons for doing so could be:

Due to the volume of rules, definitions and tables needed to have a working semantic and syntax for one language, space restrictions may force the environment to restrict languages to one for each logic step in the invention. This may impose irritating restrictions in an environment using several languages. By multiplying the instances and using, for example, one instance for compiling internal code to ADA and another instance of the invention to compile the same code for CHILI, the invention will prove adaptable to the environment's needs.

Another reason for connecting different instances of the invention to each other, may be the knowledge expressed in rules, definitions and tables, concerning target machines. A possible way is then to dedicate one instance of the invention to knowledge about one machine, making it easy for the environment to determine what instance of the invention to use for the information processing process.

The current state of art in machines may make it impossible to reach the volume capacity for, for example, the database device. By adding instances of the invention and connect these to each other a capacity corresponding to the needs in the environment can be achieved.

INFORMATION

General

This part of the description describes the information used, generated or updated by the invention, and the information passed between the environment and the invention.

In general, the information has been separated into two parts:
A) Control information.
B) Specification information.

Control Information

Control information is information dedicated to this invention. This control information is expressed in something referred to as control language. This control language could be, for example, one person telling another person "Please extract the dynamic parts of this base document and put them on a separate paper, number that paper according to our usual standard and put the reference to that paper on the base document preceded with a %-sign, the word DYNAMIC DESCRIPTION and then put the number on the extracted paper".

It could also be a line of ASCII-text input to a computer, in which the dynamic description device is implemented, stating: #Basedocument="Thebasedocumentname".

The scope of possibilities is, as usual, somewhat of a problem in describing things. For this description a special notation is used for control language statements, all such statements are preceded by a "#" sign, to clarify that this is control language. When it comes to the control language statements themselves they are expressed as far as possible using normal English and referring to logical units that are normal parts of this description.

Some control language statements are of a nature not suitable to use for each case of contact between the invention and the environment. These kinds of control language statements are referred to as:

Rules

The rules are related to the selected language and its valid use in the actual context, that is, the syntax and semantics of the chosen languages. Further rules are globally valid, for example concerning different machines on which amended functions are to be installed, their constraints in respect to memory size, number of possible total processes in multiprocess environments, etc.

Definitions

An example of such a definition could be the definition of how floating point notation is defined, to make it possible for the check device to evaluate and alert the environment if there is a risk of ambiguous behavior on the machine that is selected to receive a specific amended function.

Tables

An example of such a table could be a memory map, describing the organization in code, data and protected address space in a computer which could be the target machine for amended functions.

Specification Information

Specific information is used by the environment, including before process and after process, seen from this invention's point of view, to specify the actual object of construction, and the information generated, updated or used, by the invention itself for the same purpose.

This type of information is frequently referred to as "language". To clarify this point a bit, the invention uses four languages:

Specification language

This language is the language used by the environment to describe and specify objects of construction. This language could be any language fulfilling the two demands that this invention puts on a language in order for that language to be used:

1. The language has to be a finite set of elements with an exact definition of the meaning of each element, that is a complete syntactically correct definition.

Current state of art and tradition gives examples like CCITT's definition SDL a normal level for languages that are candidates. It should be noted that there is nothing whatsoever, to prevent the use of a selected subset of a very large language that in total does not fulfill this requirement, but in the selected subset does, or by addition could be made to fulfill it, for this purpose. This makes for example English a candidate.

2. The second requirement that a language has to meet to be used for this purpose, is that the language has to provide the capability to handle static, interface and dynamical descriptions of objects of construction, that is, actually representing different views on the same object. What is said under 1, also applies here.

Invention specific language

This language is the language used by the invention itself. Depending on how the invention is implemented, this language has a very wide scope, the extremes being on one hand exactly the same as the specification language. In the case of human handling, there is no more suitable format than the one produced by the humans in the environment. In this case, the device taking initial input to the invention, could very well be taking a handmade sketch and turn it into another document using rulers and fiber pencils to make it more readable. On the other hand, assuming usage of computers, it could be a very extensive and significant change, translating words into integers, drawn symbols into numbers, representing empty space on a drawing with numbers or names, etc.

For the invention, the important logic is that there is a language directed to the environment that this environment can use in using the invention; that there is another language that is suitable for the invention in the way that it has been implemented and there is a way to translate one into the other.

Internal code language

The internal language is different from the invention specific language in that it contains elements having relation and meaning only to the invention, and never reaching the user of the invention, exemplified by internally used references, that could be totally different for the invention and the user of the invention as he or she expresses these in the specification language.

Intermediate language

This is a language directly mapped to a computer, per definition, called programming languages. For this invention the most significant property of such a language is the fact that a compiler for that language has to be available somewhere in the environment. This type of language could be exemplified by PASCAL, ADA, CHILL or any other language normally referred to as a programming language.

It should be noted, that nothing whatsoever disables the environment to specify a very low language as intermediate code, for example could assembler very well do. Even direct use of machine language is possible, thus making further processing in the compiler and linker, stationed in the environment, unnecessary.

The selection of intermediate code will be subject to considerations by the environment, using one instance of the invention.

In general it could be stated that the closer to the machine the language is selected, the more of the entire process could be handled by this invention, represented in its extreme by automatic insertion of executable code in runtime. This, however, meaning that the scope of target machines, due to limitations in physical properties of the devices like storage space, would shrink significantly, maybe only allowing one type of machine/operating system as the target.

The other extreme is represented by languages like ADA, constructed to be portable over the machine world, thus making the invention's requirement for machine knowledge small, allowing more of the resources to be put in the more abstract part of the construction process, but, on the other hand, putting more demand on further processing in the environment.

Information Unit Description

In order to describe the invention a number of units has been named to label information units essential to the function of the invention:

Formal description

The term "formal description" is used to put a name on a unit of information that is carried by some media, and input to the invention in a first stage, containing both control language and specification information.

Base document

The base document is simply a translated form of the formal description in a format more suitable for the invention's processing. The base document is also containing specific information used by the invention for tracking and identification purposes. An example of such information is the identification of the instance of the device that generated the document, the time, date, user specifications, restrictions on use of the document, etc, which is all part of the control part of the base document.

Static description

The static description is an extraction from the base document, containing only the static parts of the description. The static description part is replaced in the base document by a reference to this document, thus making any changes to the generated static description a part of the base document.

Interface description

The interface description is an extraction from the base document, containing only the interface parts of the description. The interface description is replaced in the base document by a reference, making all changes to the interface description automatically a part of the base document.

Dynamic description

The dynamic description is an extraction from the base document of all parts in that document that is part of the dynamic description. The dynamic description is replaced in the base document by a reference to the dynamic description, thus making any changes to that document a part of the base document.

Internal code

The internal code is a collection of static, interface and dynamic descriptions. These descriptions may or may not be part of the base document that is used for the translation, simply due to the fact that a reference could refer to something that is a reference in itself. In the internal code document, all references are included. Furthermore, control information is included, for example specification of the target machine, etc. The internal code document is the first information unit in the invention that is required to be complete, that is all the information needed to produce a software in the form that is the intermediate code, that is, the internal code can contain logical units which are not part of other languages used in the invention, exemplified by a rule stating that the specification language unit BLOCK should be mapped against the internal code unit SEPARATELY EXECUTABLE, which in further processing then could be mapped against the representation PROGRAM of the intermediate code.

Depending on the devices that the internal code document has been processed by, it will also contain information from checking device, pointing out errors and ambiguities, information for the simulation device, by the simulation device generated information, information to the compiling device and information generated by the compiling device.

Intermediate code

The intermediate code is a document in the syntax of one selected language that is used for processing by the environment's complier to receive a code, local to one instance of a machine and suitable for input to this environment's linker or on such a level that the further processing in the environment can be excluded, and the information directly input to a computer for storage in such a manner that it can be executed or used by executing parts.

Control information

The control information is expressed in control language. The control language is divided into parts for the purpose of this description and descriptions like ERROR, QUESTIONS, ALTERNATIVES and SELECTIONS all refer to these things in the syntax of the control language.

CONTROL FLOW

The description of the control of the invention has been divided into two parts. One part describes external control flow, that is, how the environment can control the invention's work. The other part describes the internal control flow.

Environment—Invention

The environment can control the invention in three ways:

1. In the standard case, the environment submits a formal description to the invention and the invention carries out the processing according to the normal case, that is, using the invention's internal control flow.

It will probably be a very rare thing that this process is continued to its end in one step, that is, it is very unlikely that the internal control flow will be carried out to the end, the reason being that this case assumes that there are no errors, no ambiguities or demand for a decision on any point in the process.

2. The other case of control is the control that the environment can apply, using the control connectors of the invention, that is the connectors 1, 3, 6, 9, 12, 15, 24, 27 and 30 (FIG. 3).

By using these connectors and sending control sequences on them, any step can be redone using any document as a target for the processing, by specifying the document identification in control language.

It should be noted that control language is a valid part of all documents, input to any device. This means that the interrupts in the processes could be controlled already when submitting the formal description to the invention. For example, the statement:
NODYNAMIC
would stop the creation of the dynamic description, thus ending the process when interface description device has finished its work. This would mean that the process of the invention would be impossible to complete. Another example:
NOSIMULATION
would allow a complete generating of the internal code and stop the process there, making a compilation to an intermediate code impossible, which (reference: examples of connecting to the invention) in some cases could be desirable.

It should also be pointed out that the control language can be used for specifying behavior that is not normally used. For example, the control language statement concerning process interruption exemplified before could also state an output connector for the produced document, that is #OUTPUT-RESULT-CONNECTOR <outputconnector>, thus making it possible to control (in a local and limited sense) the information flow.

3. The third case of control is using the input/output connectors for the logical document processing step. That is, getting a document, rearrange it with a suitable device connected to the invention, and then send the same document in the updated version back to the device that delivered it, thus trigging the device process start.

In the control flow case it should be observed that we are really talking about two types of processes. One is the process as seen from a "device" point of view", that is, each device in the invention carries out its own process, thus contributing to the invention's main process. But the process could also be seen from the view of the information. Taking this latter view, it should be noticed that the process is always the same. Even if the invention's process can be interrupted in time, the process always follows the predetermined steps, and there is no way of going around it, ensuring the invention's successful processing, checking and deliverance of the main process result.

Internal Control Flow

Figure 8:
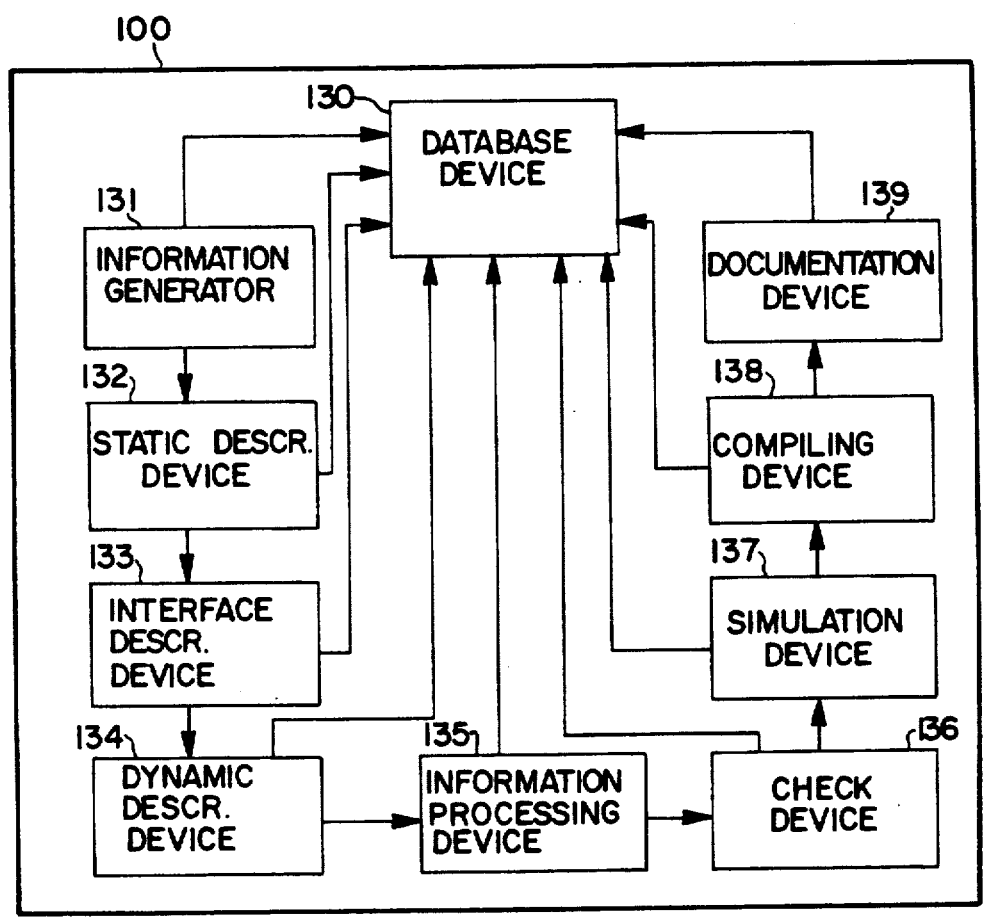
FIG. 8 is a diagram of the internal control flow.

A specification, having no errors, or having errors that can be solved directly applying rules, definitions and tables, or directly in interaction via human intervention or being of such a nature that they are not fatal, will automatically be processed according to the control flow shown in FIG. 8. That is, the following steps will be automatically taken:

1. The generated base document will be sent to the database device 130 for storage, and to the static description device 132 for processing.

2. The generated static description and the updated base document is sent to the database device 130 and the processed base document is sent to the interface description 133 for further processing.

3. The generated interface description and the updated base document is sent to the database device 130. The updated base document is sent to the dynamic description device 134 for further processing.

4. The generated dynamic description and the updated base document is sent to the database device 130. The updated base document is sent to the information processing device 135 for further processing.

5. The generated internal code document is sent to the database device 130 together with the updated base document. The generated internal code is sent to the checking device 136 for processing.

6. The updated internal code is sent to the database device 130 and to the simulation device 137 for further processing.

7. The simulation device 137 decides, based on properties of the system, how the simulation can be made and carries out the simulation accordingly. The updated internal code document is sent to the database device 130 and to the compiler 138 for further processing.

8. The compiler translates the internal code into an intermediate code and sends this code to the database device 130, the external connection and to the documentation device 139.

9. The documentation device 139 documents the base document, static description, dynamic description, interface description, internal code information that is not a part of the information mentioned before and intermediate code, and delivers these documents to the device connected, thus ending the process.

The normal process of control flow in the invention could be interrupted by occurring errors and ambiguities, making it impossible for one or more devices to carry out their processing. The general strategy for the invention in these cases are to save everything that has a meaning to save, thus making the environment's needs for alterations and intervention as small as possible.

Notable is also the dependences between the need of information in the different devices, making the process equal for all new, amended or changed functions, but possibly interrupted in time. For example, the information processing device 131 requires an error-free base document, thus making it impossible to randomly use the devices separately, in a conceptual sense.

INFORMATION FLOW

For description purposes the description of the information flow has been divided into a description of the information flow between the environment and the synthesizer 100, and another description describing the internal information flow. Also for describing purposes, the static description device 132, the interface description device 133 and the dynamic description device 134, have been joined into one description unit, called document processing device 140. This is purely for describing purposes.

The connectors valid for the flow operations have been excluded for reference: see the connection description (FIGS. 3, 4).

Figure 9:
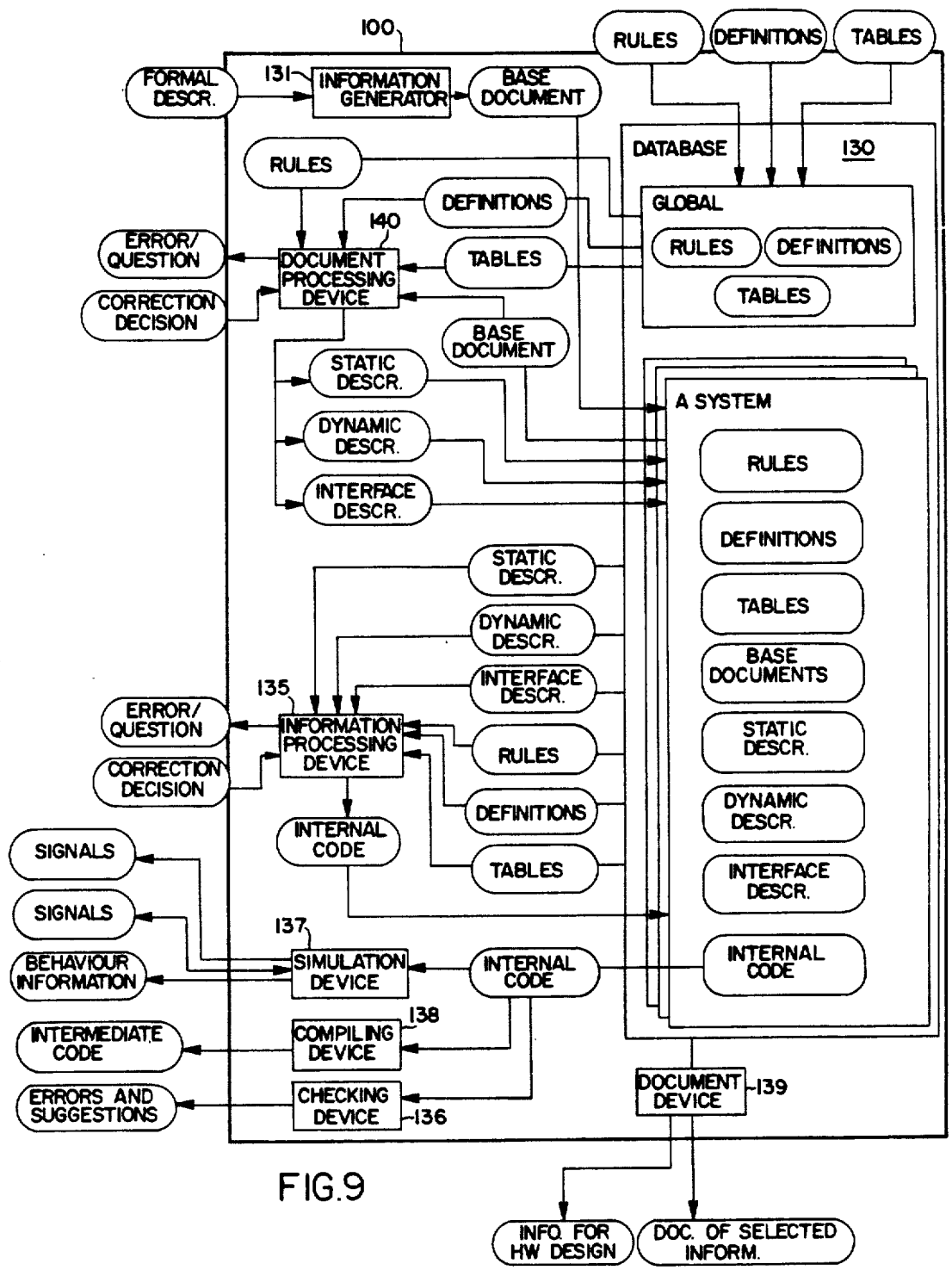
FIG. 9 is an overview of the external and internal information flows according to the invention.

An overview of the information flow is shown in FIG. 9.

Information Generator

Figure 10:
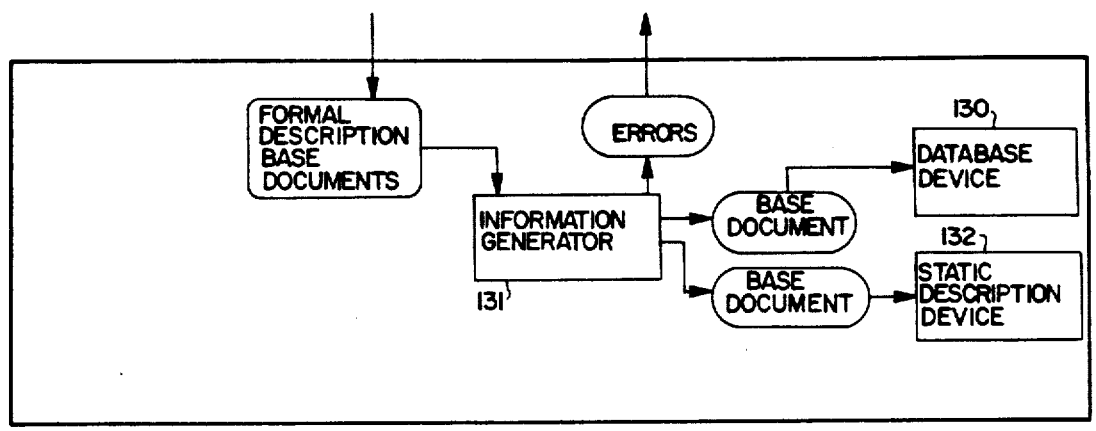

As is shown in FIG. 10, the information generator 131 takes formal descriptions and base documents from the environment. It generates errors, questions and alternatives in control language syntax, for the environment. It updates formal description and base document with references making it possible to connect one to the other.

From a formal specification, the device generates a base document. The device passes base documents and formal specifications to the database device 130 and the base document to the static description device 132.

Static Description Device

Figure 11:
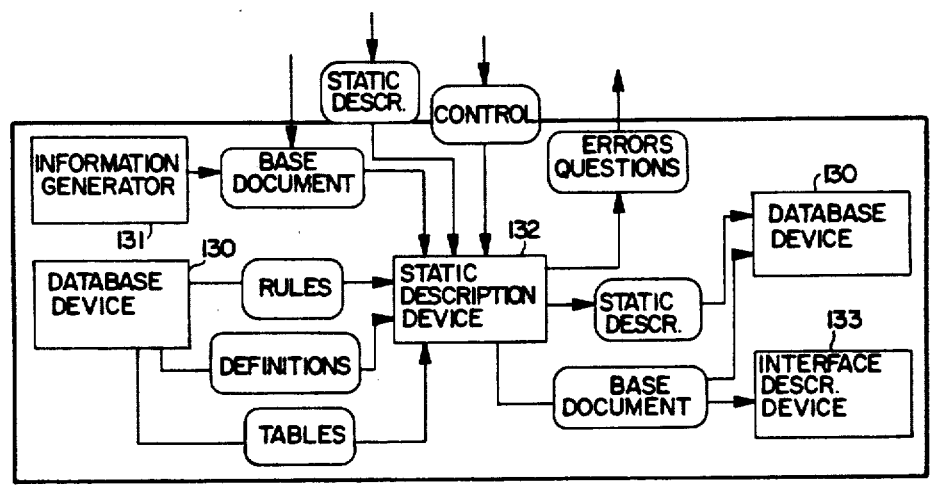

As is shown in FIG. 11, the device takes a base document from the information generator 131 or the environment, or a static description from the environment.

Correct parts of the static description of the base document are used to generate the specific static description and is transferred to the database device 130 if possible, that is, if enough parts of the static description are correct to determine the context and identification of the amended function.

Detected errors are sent to the environment and the environment has the possibility of using control language to correct these errors. The errors are noted in the base document and the static description, if this is possible to store.

The extracted parts of the base document are replaced with a reference to the static description, thus making future changes automatically a part of the base document.

The device sends the base document to the database device 130 for storage to ensure that whatever happens in the next device in the process, the resualt from this device will be deliverable to the environment.

Finally, the device sends the base documents to the interface description device 133 for further processing.

Interface Description Device

As is shown in FIG. 12, the interface description device 133 acts in the same manner as the static description device 132, but applies its operations on a base document sent by the environment or passed by the static device, or takes an interface description from the environment.

The device extracts the interface parts, replacing this information with a reference, thus making all future changes to the generated interface description a part of the base document.

Errors are noted in the interface description, the base document, and are sent to the environment, which has the opportunity to correct the errors via control input.

The device sends the updated base document to the database device 130 for storage, and, if no fatal errors have occurred, sends the interface description to the same device and to the dynamic description device 134.

Dynamic Description Device

As is shown in FIG. 13, the dynamic description device 134 takes as input a base document from the interface description device 133 or a dynamic description from the environment.

The device extracts all dynamic descriptions from the base document, generating a dynamic description with that information, replacing the information with a reference to the dynamic description, thus making any future change automatically a part of the base document.

Errors are noted in the base document, the dynamic description and are sent to the environment that has the opportunity to correct the errors via control language.

The device sends the updated base document to the database device 130, and if no fatal errors have occurred, sends also the dynamic description for storage.

The device then sends the dynamic description to the information processing device 135.

Information Processing Device

Figure 14:
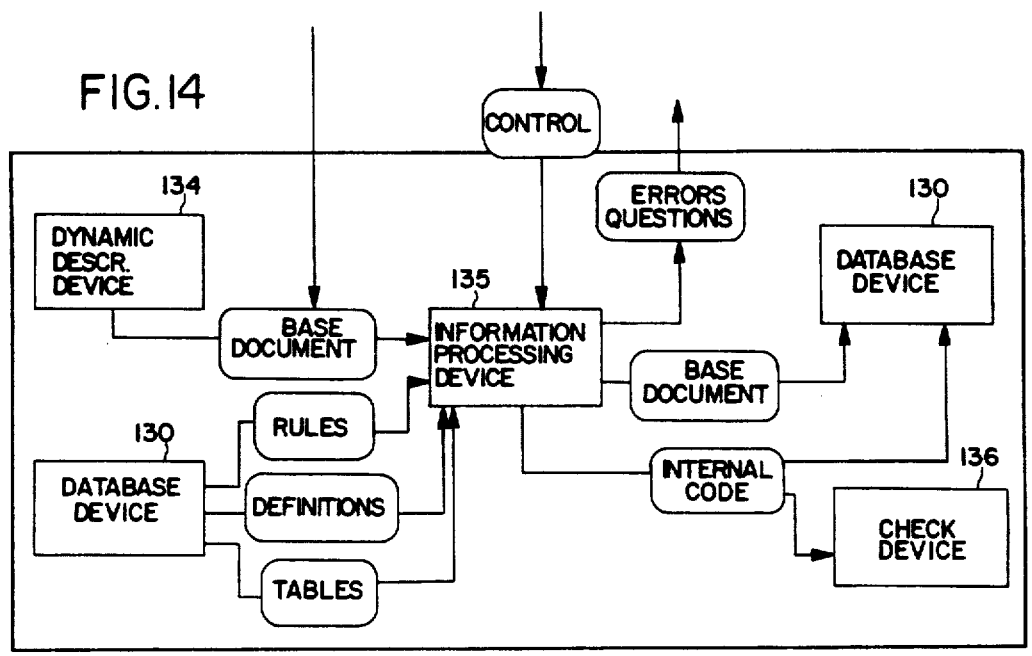

As is shown in FIG. 14, the information processing device 135 takes an error-free base document from the dynamic description device 134, or a control specification stating which base document to use, from the environment. The environment can also send internal code documents.

The device 135 generates an internal code document, solving references, adding other specifications referred to, using rules, definitions and tables that are required or requested in control format.

Errors are noted in the internal code documents, and sent to the environment. Errors of a syntactical type can be corrected by the environment via control input.

The device 135 then sends the internal code document to the database device 130 for storage, and the check device 136 for further processing.

Check Device

Figure 15:
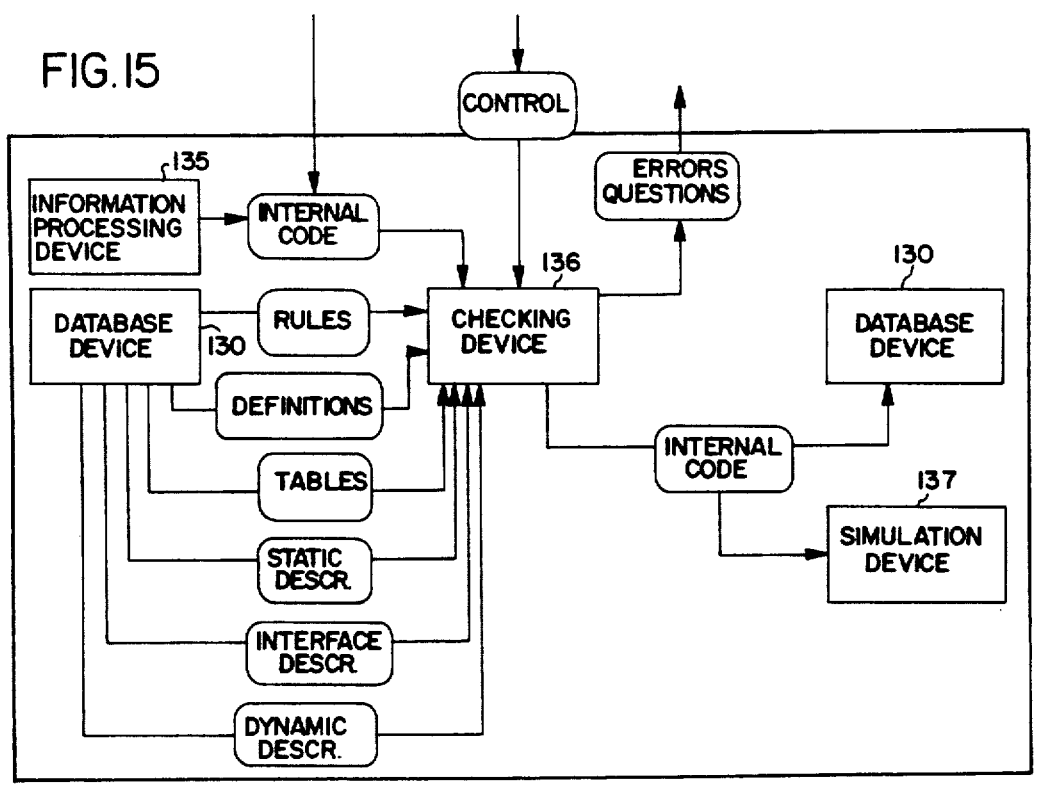

As is shown in FIG. 15, the check device 136 takes a syntactically correct internal code document from the information processing device 135 or a control specification stating which document to use from the environment, or a syntactically correct internal code document from the environment and uses rules, definitions, tables that are required or requested in control format, and uses other static, interface and dynamic descriptions to verify the internal code both in a semantic and syntactical sense.

Errors are sent to the environment, that has the possibility of correcting errors of a more banal nature in control format. The errors are noted in the internal code document.

The device 136 sends the document to the database device 130 for storage and sends the document to the simulation device 137 for further processing.

Simulation Device

The simulation device 137 takes an internal code document from the check device 136 or the environment, or a specification from the environment in control format, stating which document to process.

Depending on the control statements generated by other devices, or stated by the environment as defaults or specific for a document, the simulation device 137 simulates according to these statements in one or more levels of abstraction.

The internal code document is updated with results and notes of the simulation.

Errors are noted and reported to the environment and the environment has the opportunity to state discovered errors in control format to be appended to the document.

The document is then sent to the compiling device 138 for further processing.

Compiling Device

Figure 16:
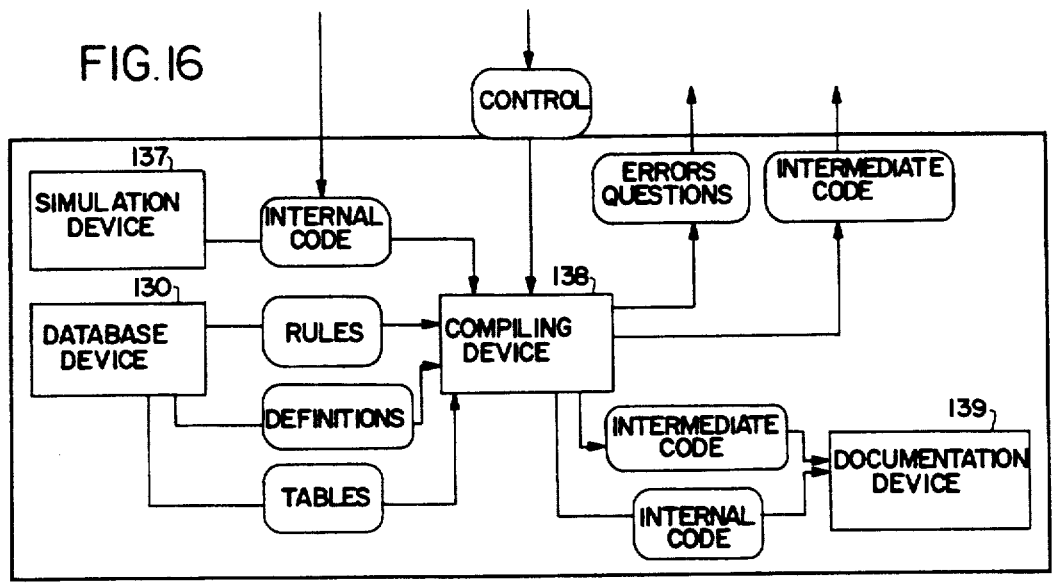

With reference to FIG. 16, the compiling device 138 takes an internal code document from the environment or the simulation device, or a specification in control format, stating which document to use.

The device 138 translates the static, interface and dynamic parts of the internal code, to the language stated by the environment in default values or control format, directly or appearing in the internal code document, using the rules, definitions and tables related to that language.

Errors are noted in the internal code document and sent to the environment.

The generated intermediate code is delivered directly to the environment and the document device 139.

Document Device

Figure 17:
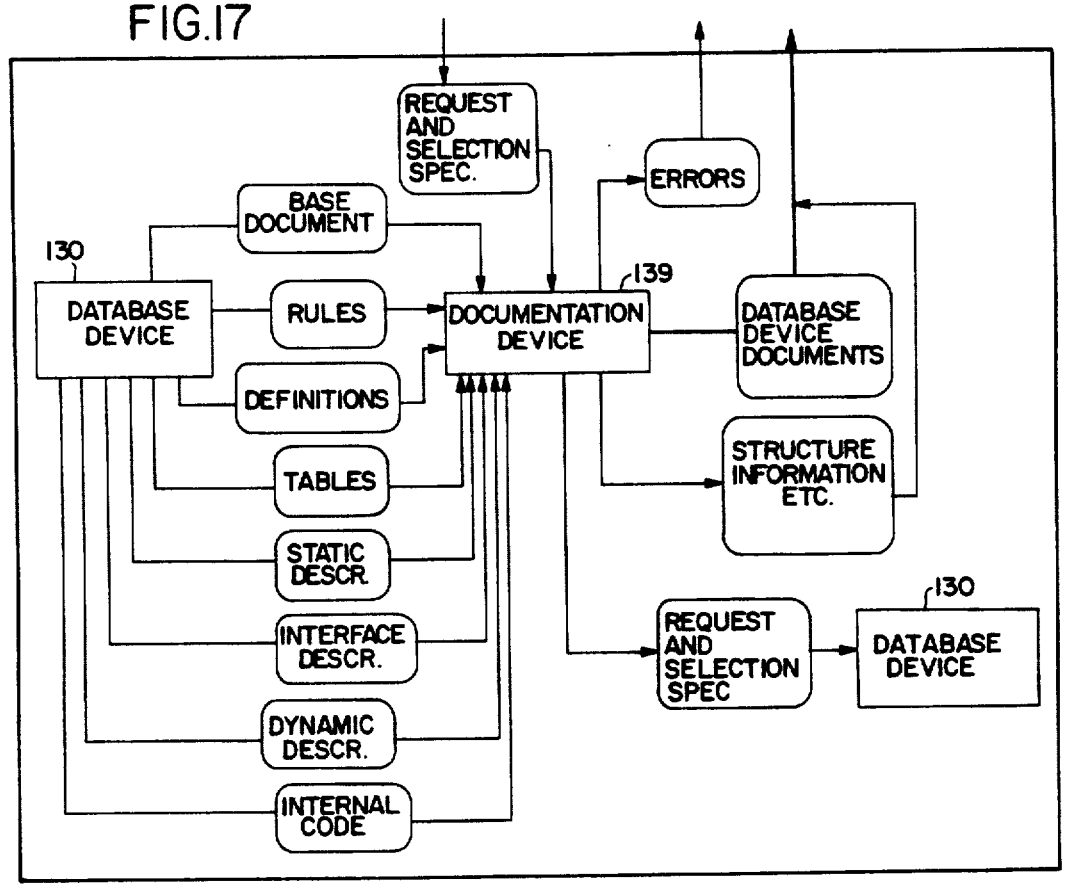

As is shown in FIG. 17, the documentation device 139 takes a request in control format from the environment and produces output in the specified form. One of the standard operations are the one performed for the compiling device 138, and is carried out by creating a listing of the generated intermediate code document.

Errors are handled by control messages to the environment.

The device 139 can be used for generating information on structures, contents, etc., and the device 139 is the front end of the environment to the database device 130 and supplies a way of navigating and reaching the information stored in that device.

PROCESS DESCRIPTION

Specification Language

To describe the processes carried out in the different devices of the invention, a schematic language is created for use as the specification language use in the invention.

The language consists of three parts:

a static part, having the logic units SYSTEM and BLOCK;

an interface part, having the logic unit CHANNEL complemented by a VALIDSIGNAL, stating what that channel can be used to transmit or receive; and a dynamic part, having the logic unit FUNCTION and containing a number of keywords for traditional operations that can be carried out by a computer, that is: input, output, +, −, /, *, etc. These keywords are not used in this description, since they are not the chief objects for the invention to handle.

A "Cold Start" of the Invention

The invention is not empty from the start. The system is provided with rules, definitions and tables for control language and internal code.

Using the control language, the environment can start building the invention's capability concerning languages and default values desired. This operation is done by connecting to the database device 130 and using control format, requesting #DEFINE of rules, definitions and tables, and then supplying values for these, thus building the syntax and semantics of the language used for formal specification, intermediate code, formats for the document device output, and so on.

Overall

When started in one of the ways described in the control flow description, the different devices can accept or reject the task. These two cases are referred to as "Process accept" and "Process reject".

Process accept is short hand for the sequence:
  Set up an internal area for the document to be created
  Mark the document with identification in internal code format Process reject is short hand for the sequence:
  Generate a process interruption
  Send error (the connectors specified in brackets)

In describing, the connectors from the connection description is used, FIGS. 3 and 4.

---

Figure 18:
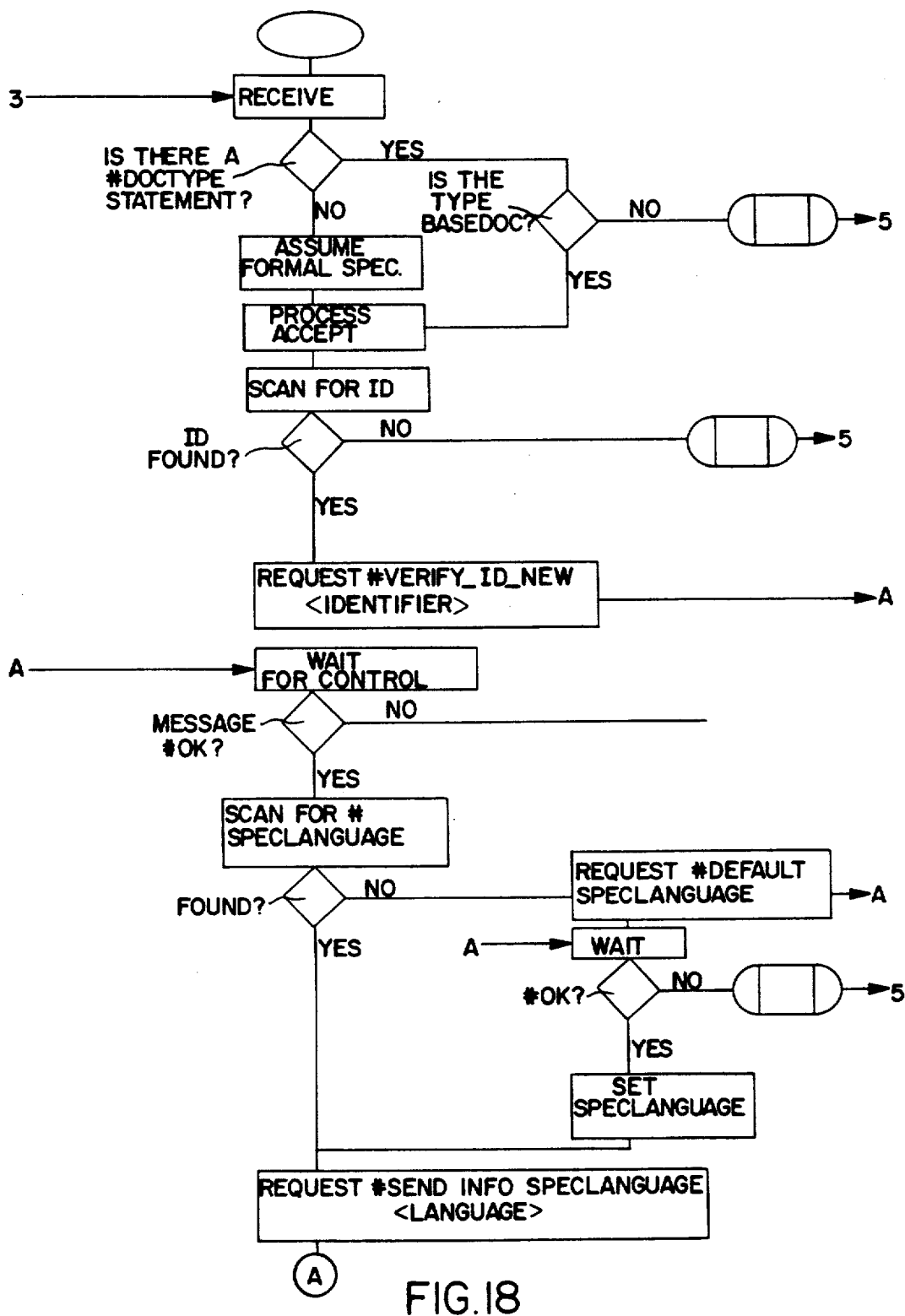
FIGS. 18–34 are flow charts of the processes carried out in the respective devices of the invention.
Figure 19:
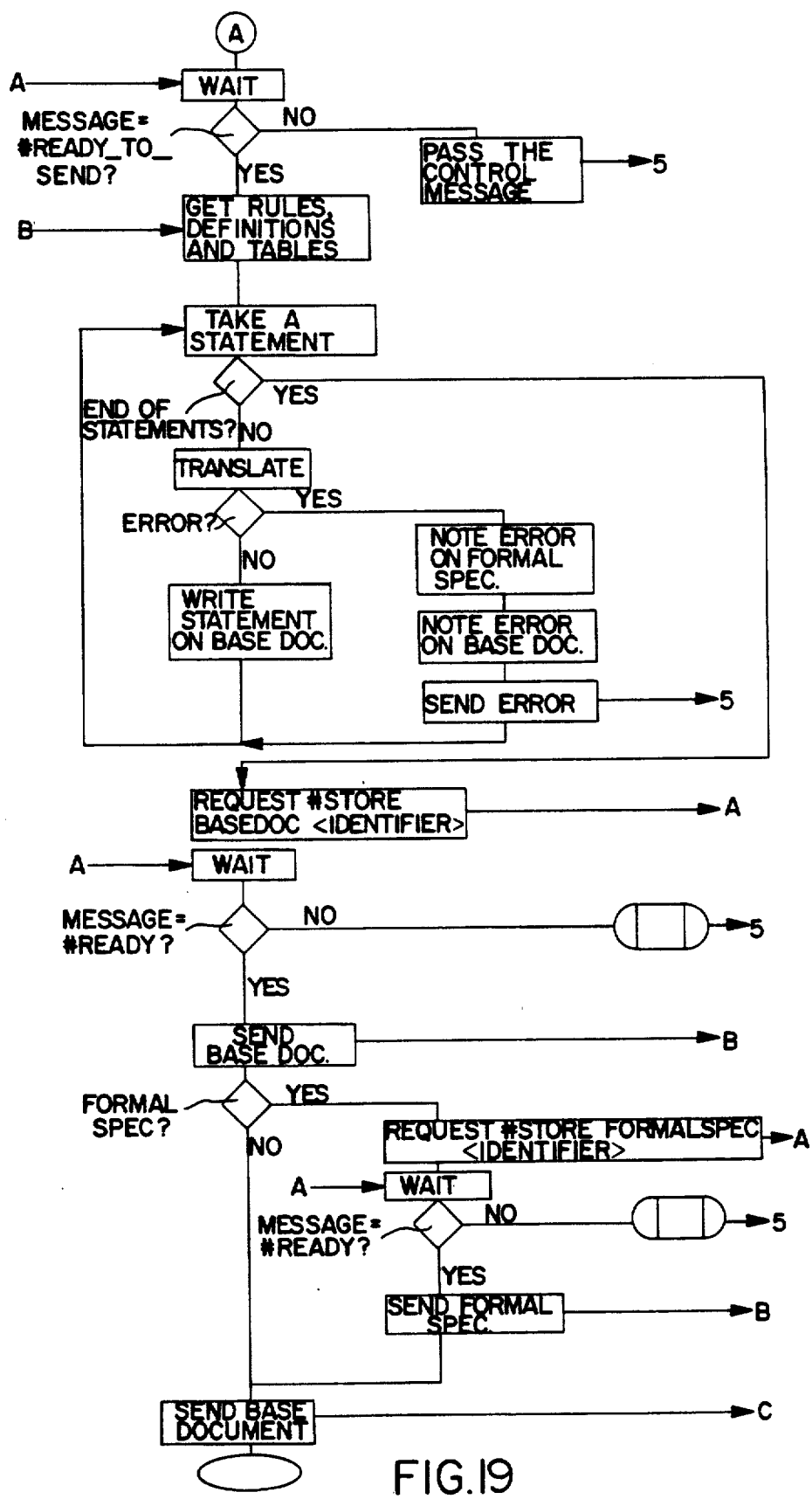
Figure 20:
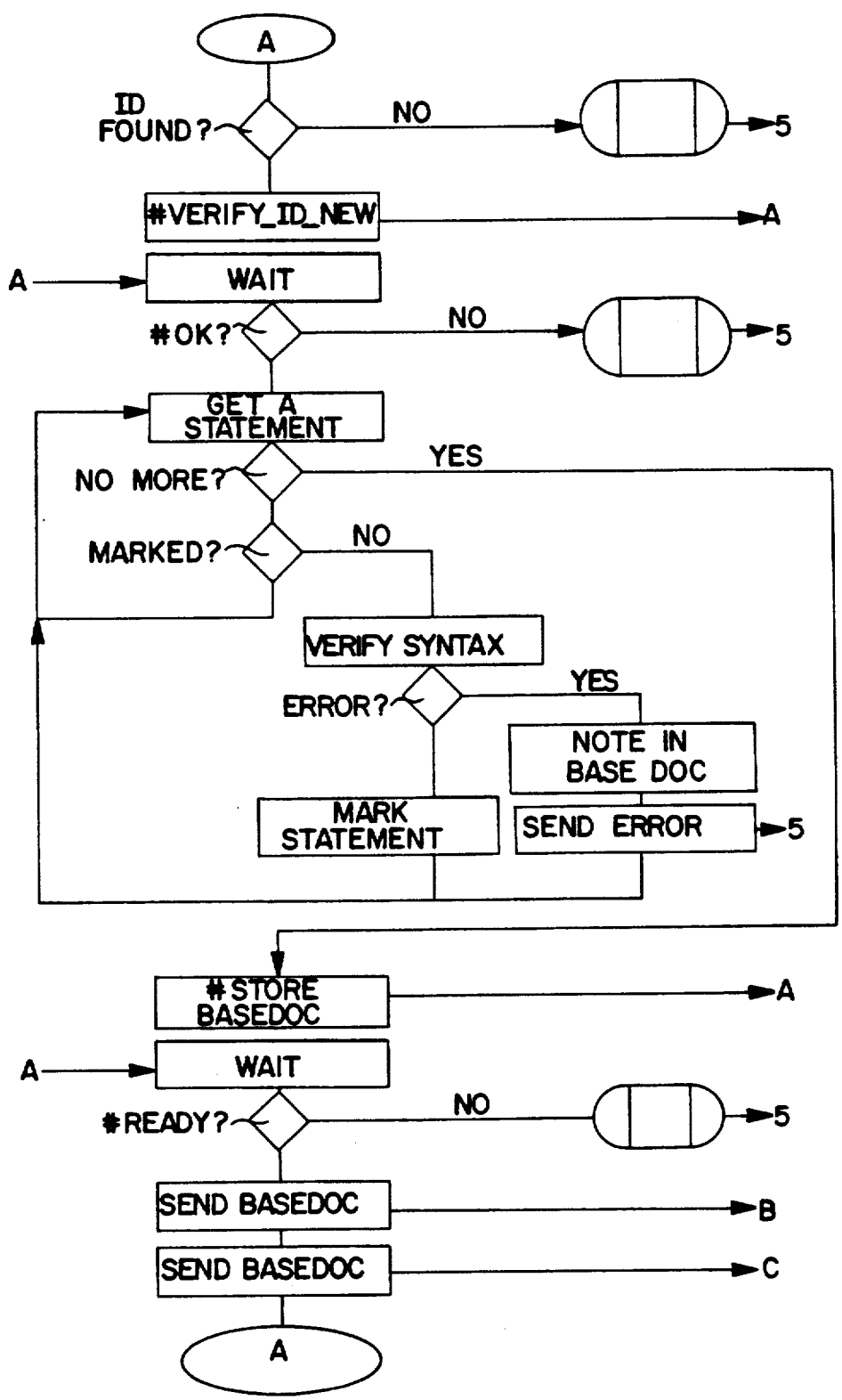
Figure 21:
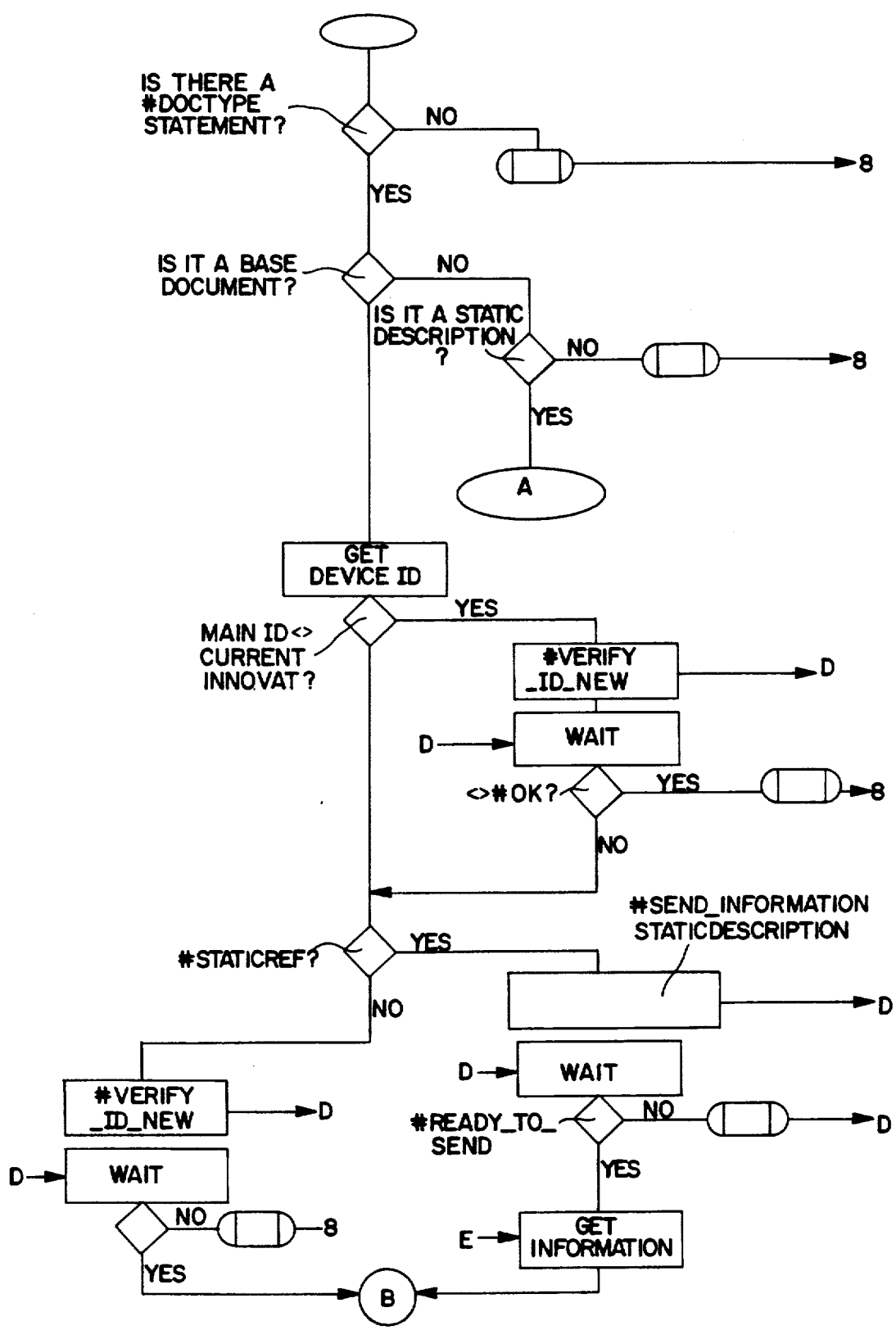
Figure 22:
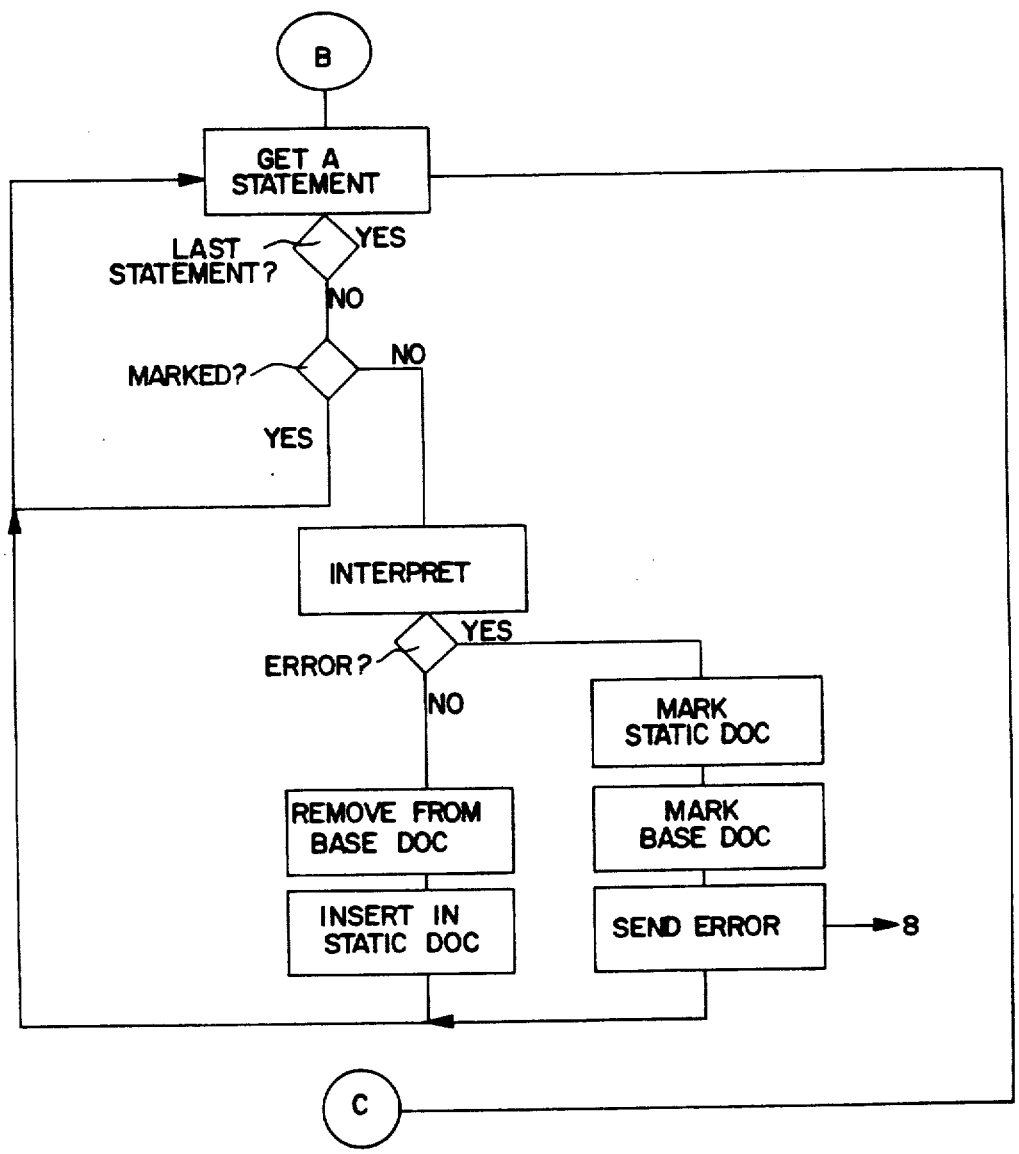
Figure 23:
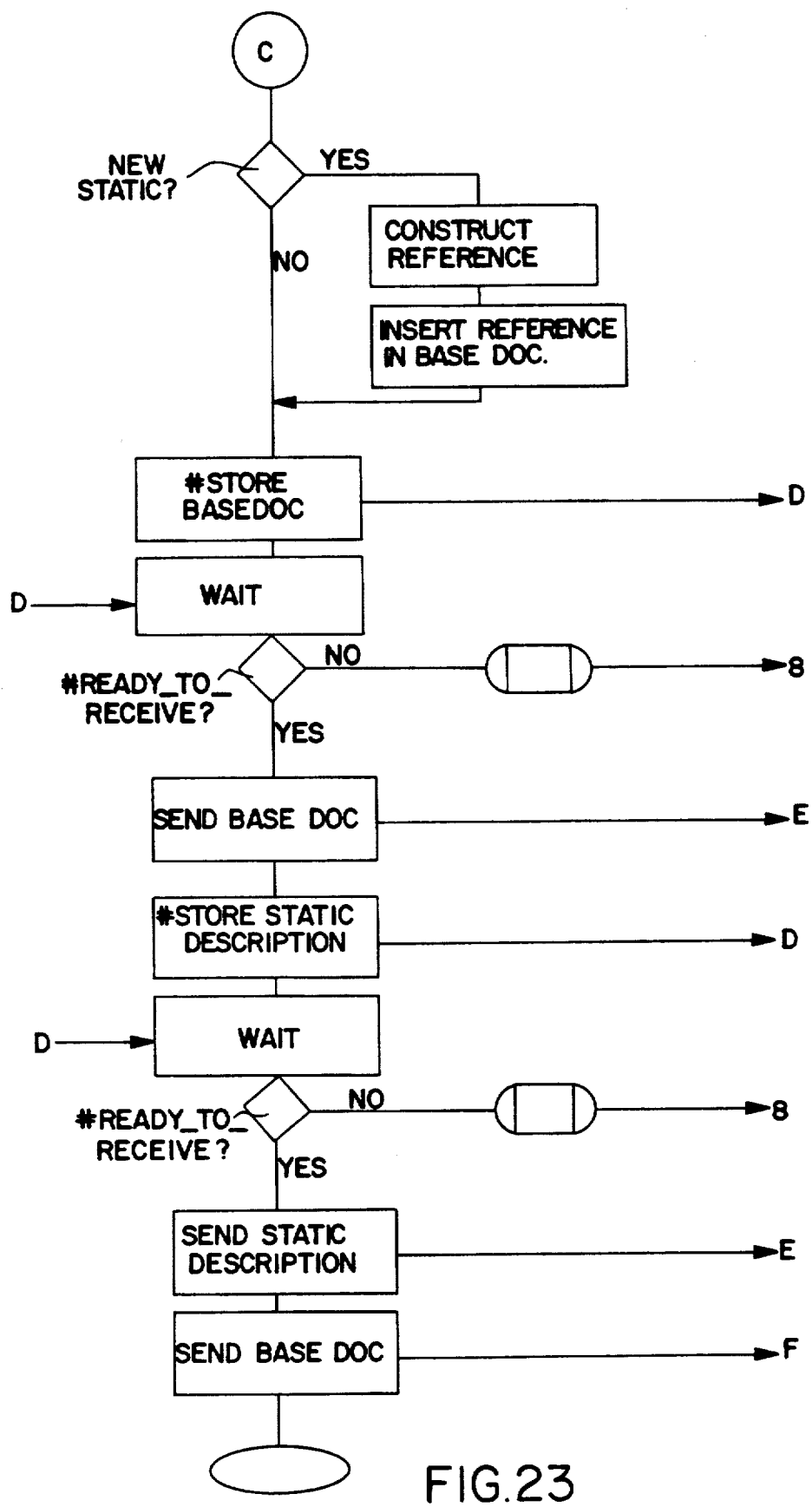
Figure 24:
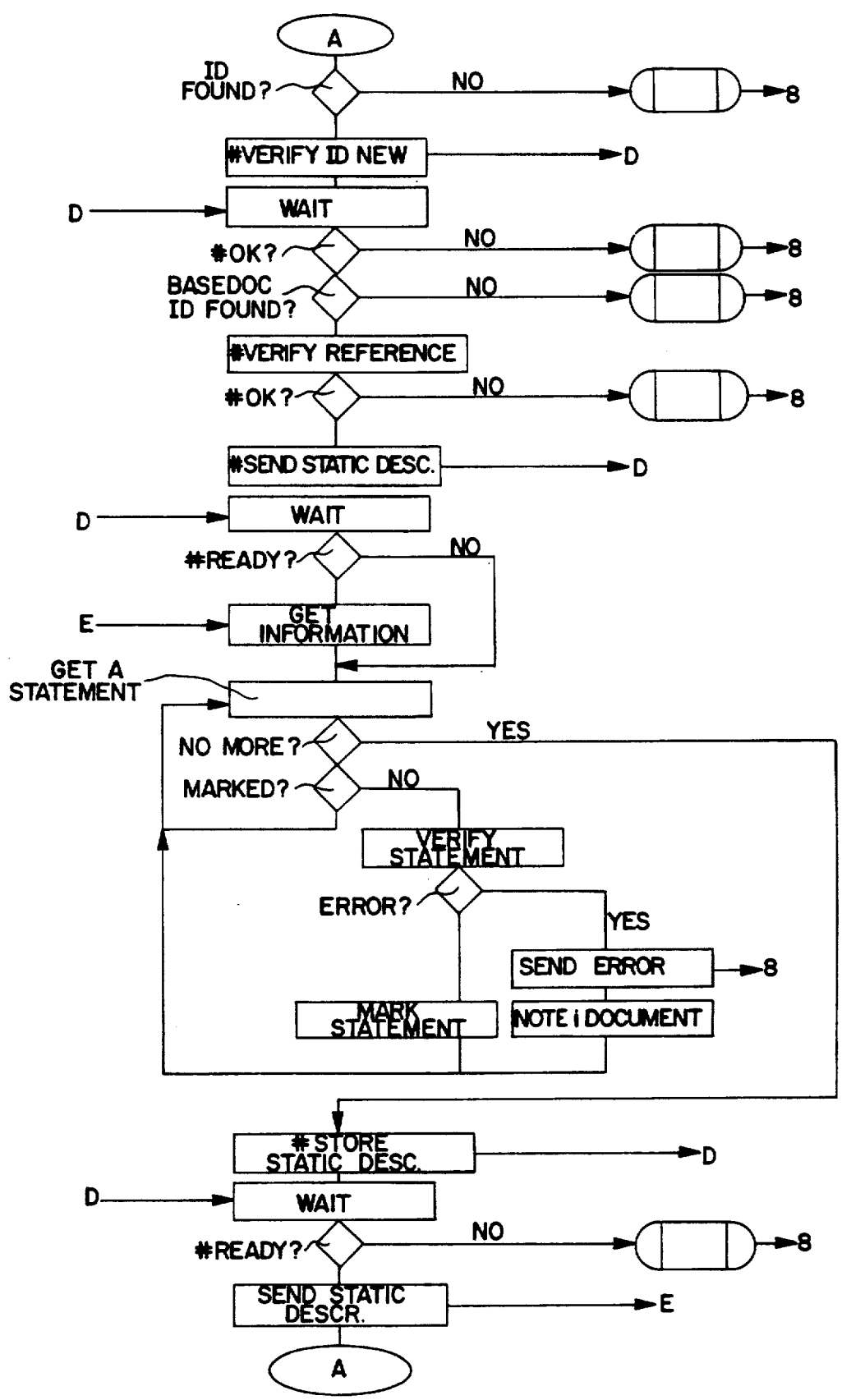
Figure 25:
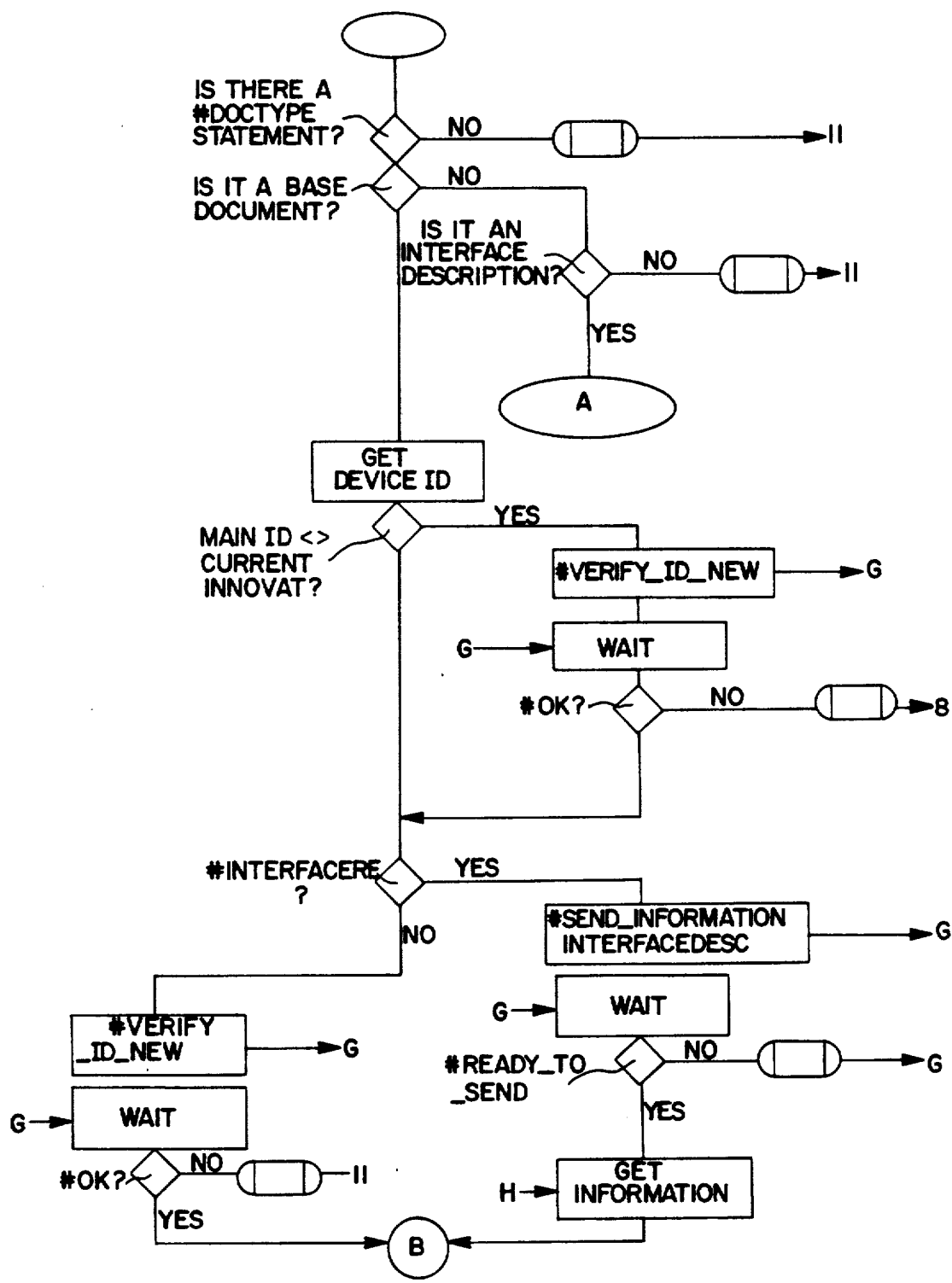
Figure 26:
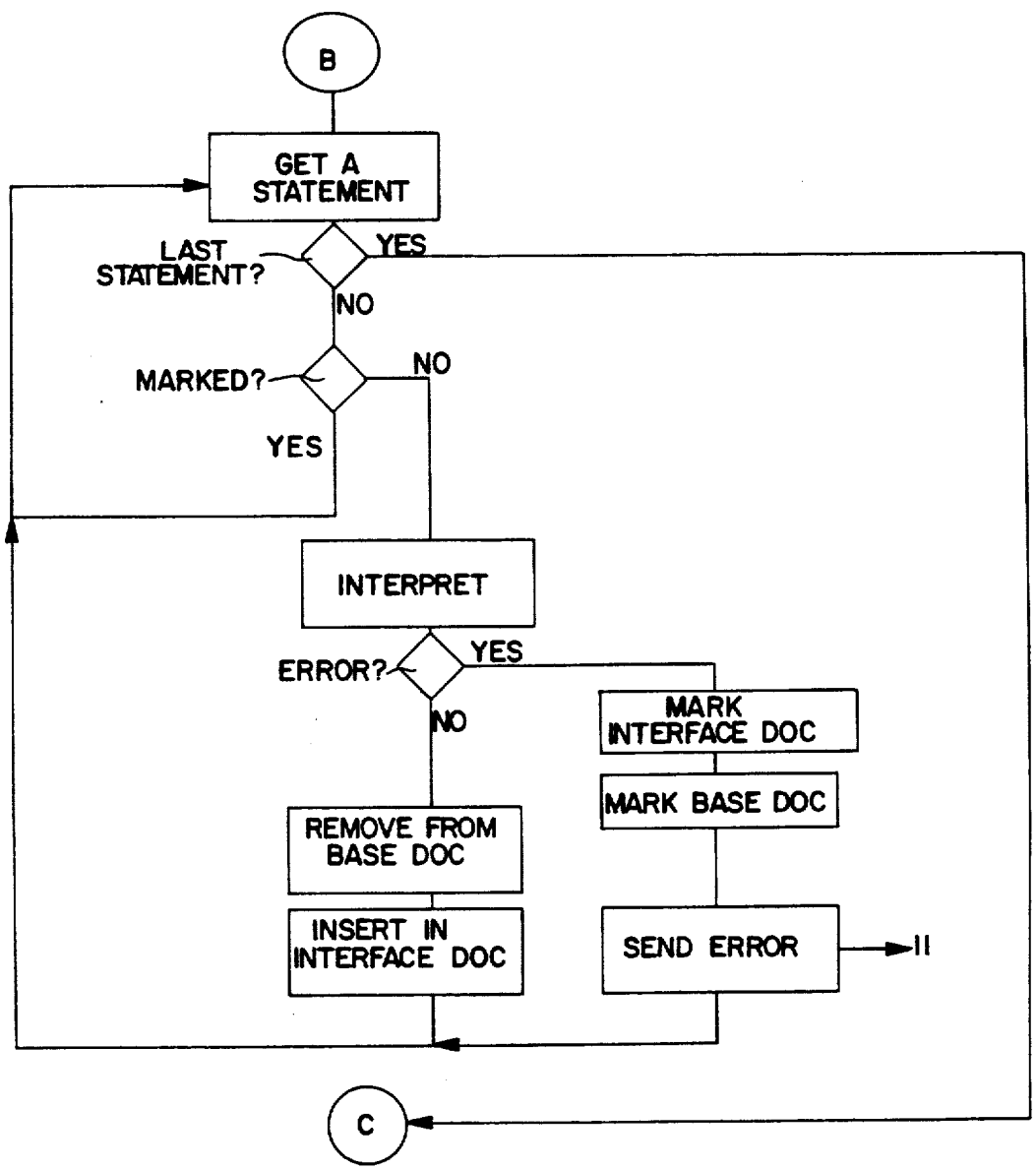
Figure 27:
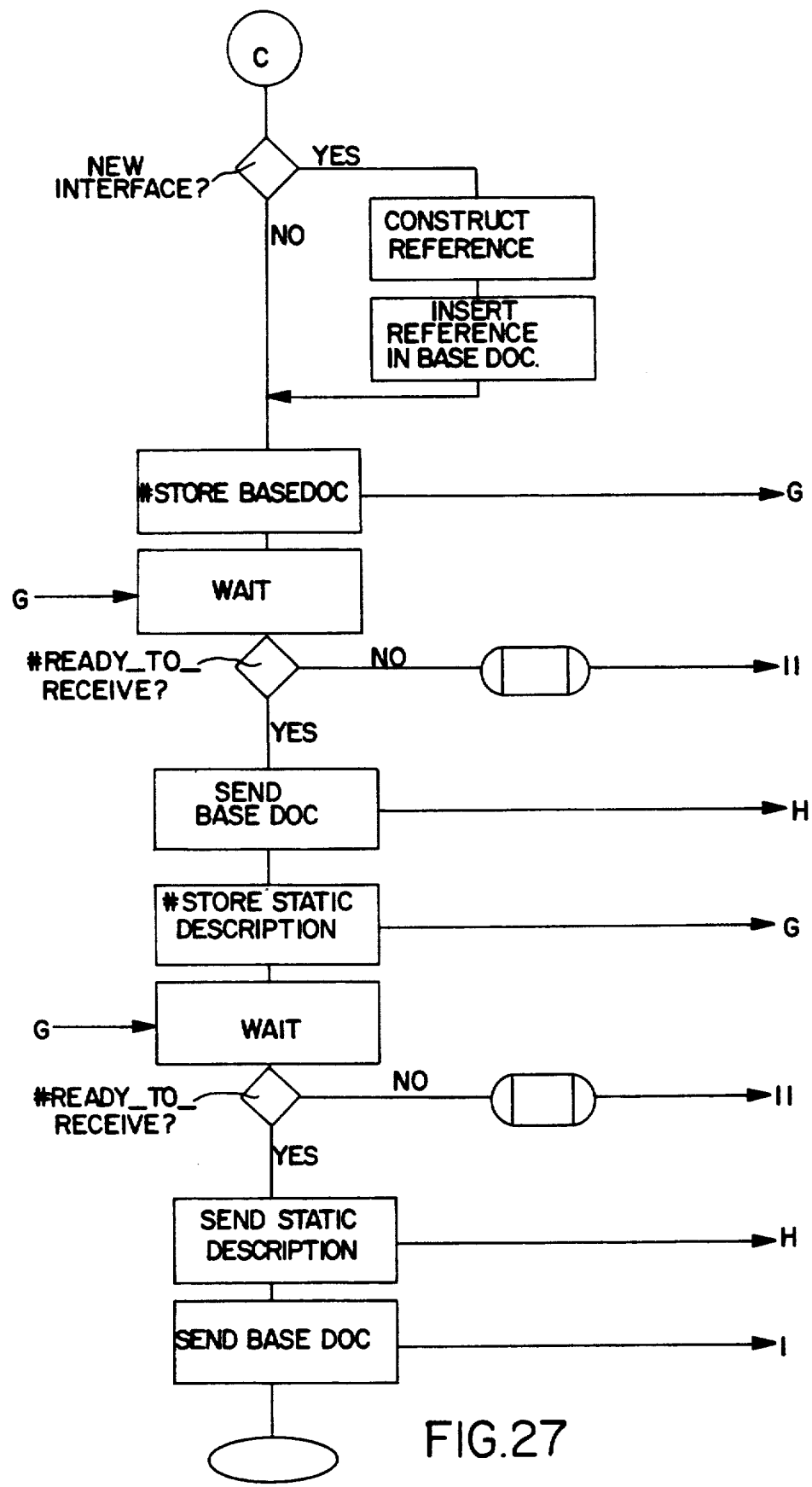
Figure 28:
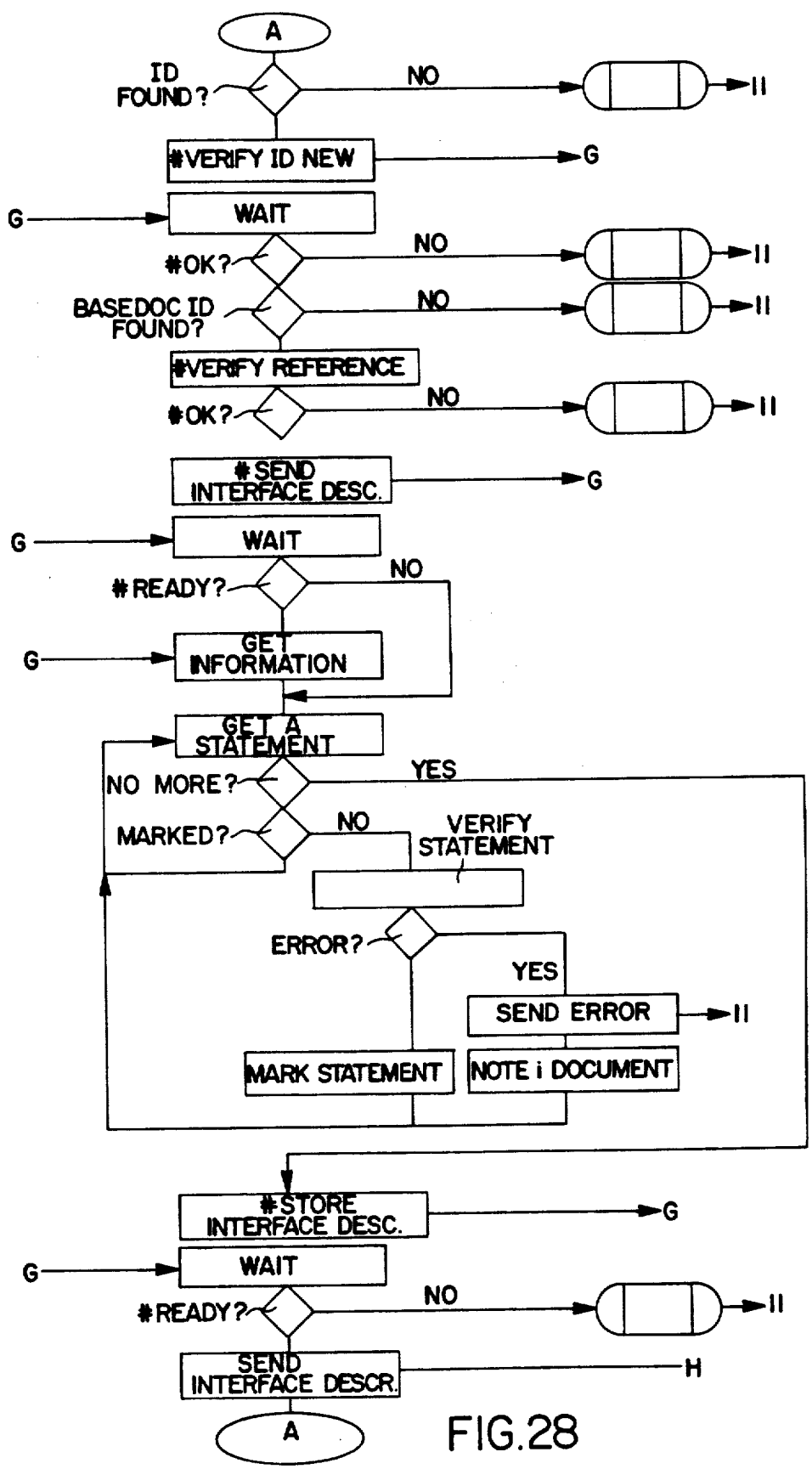
Figure 29:
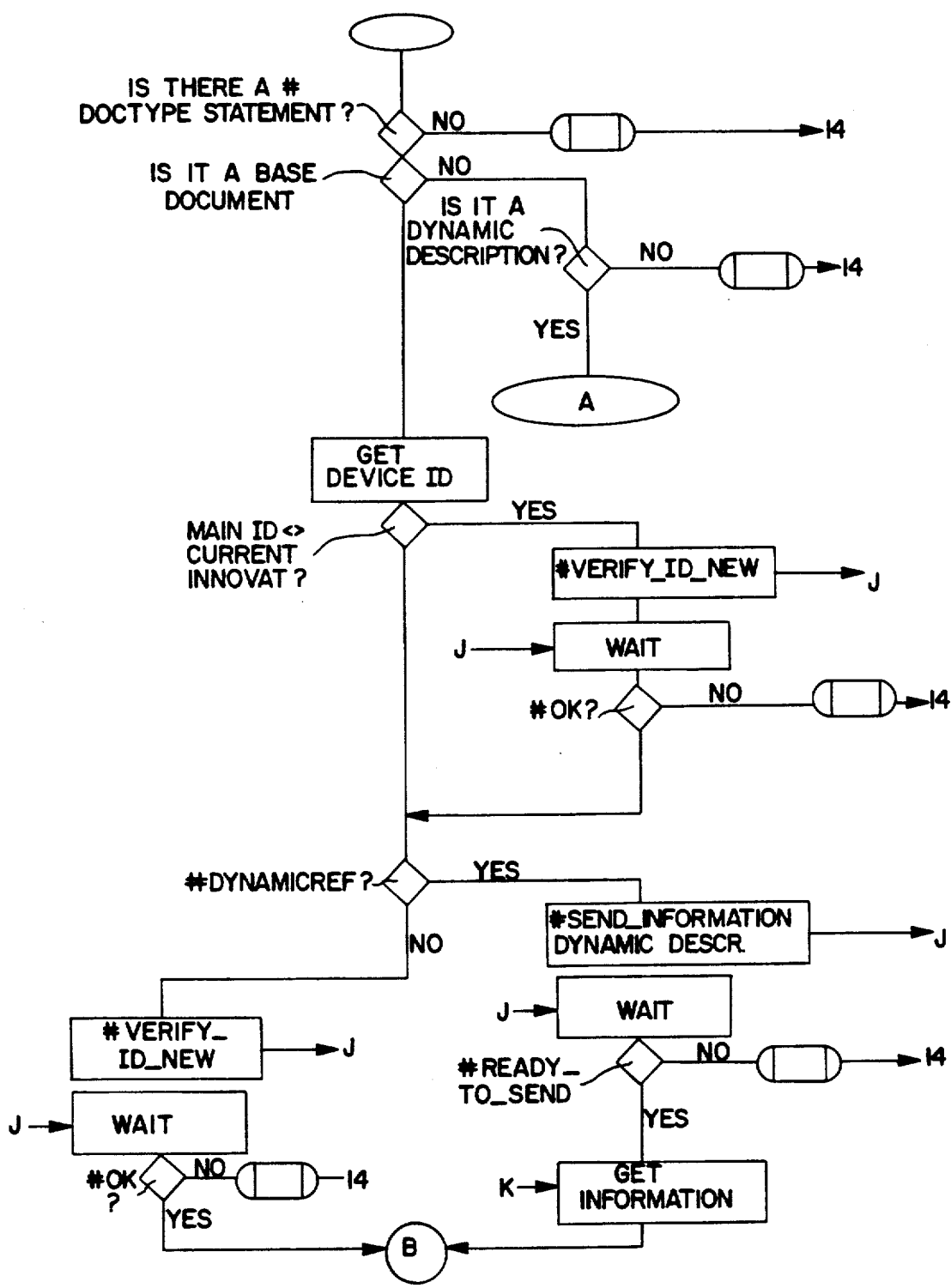
Figure 30:
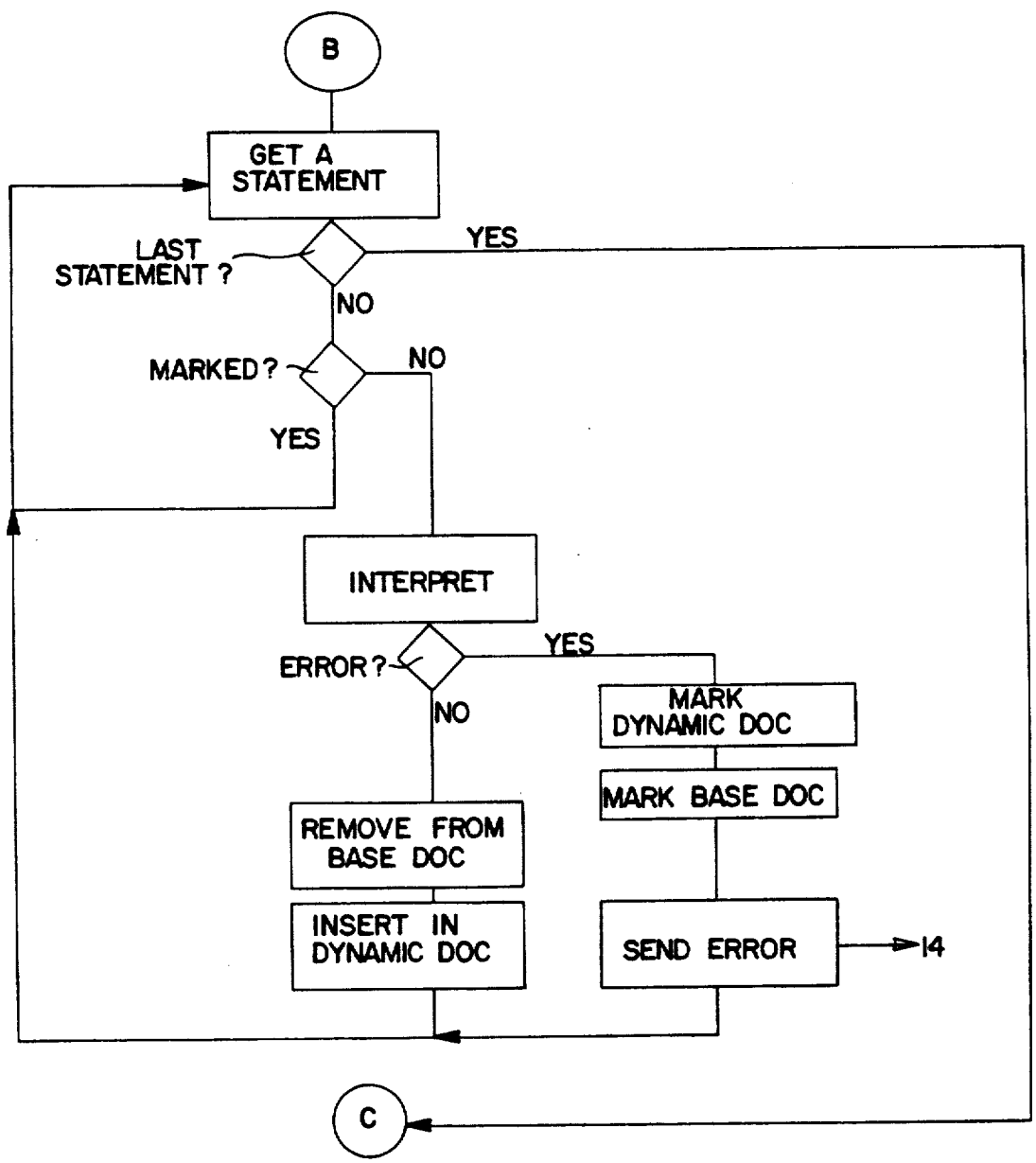
Figure 31:
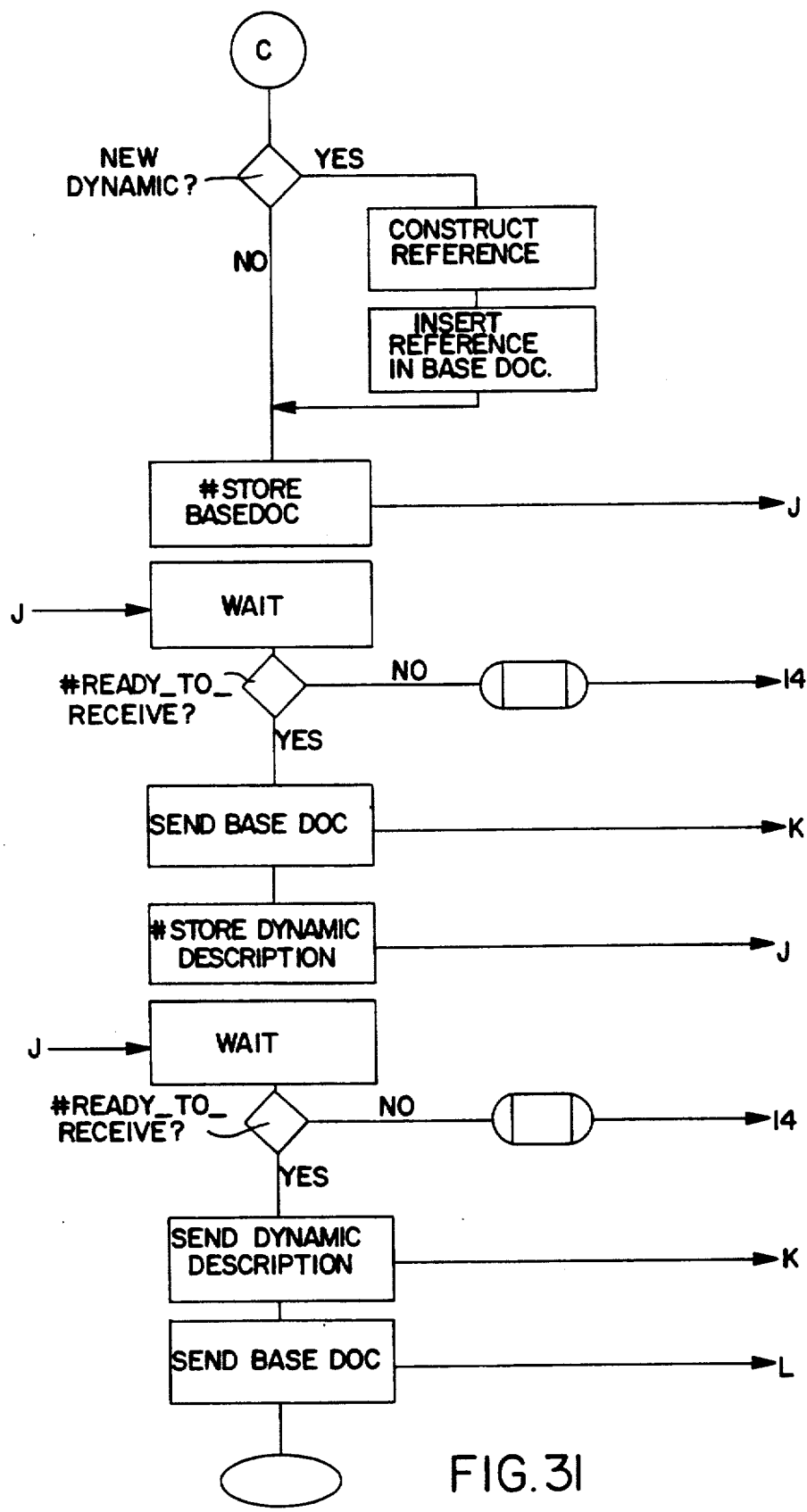
Figure 32:
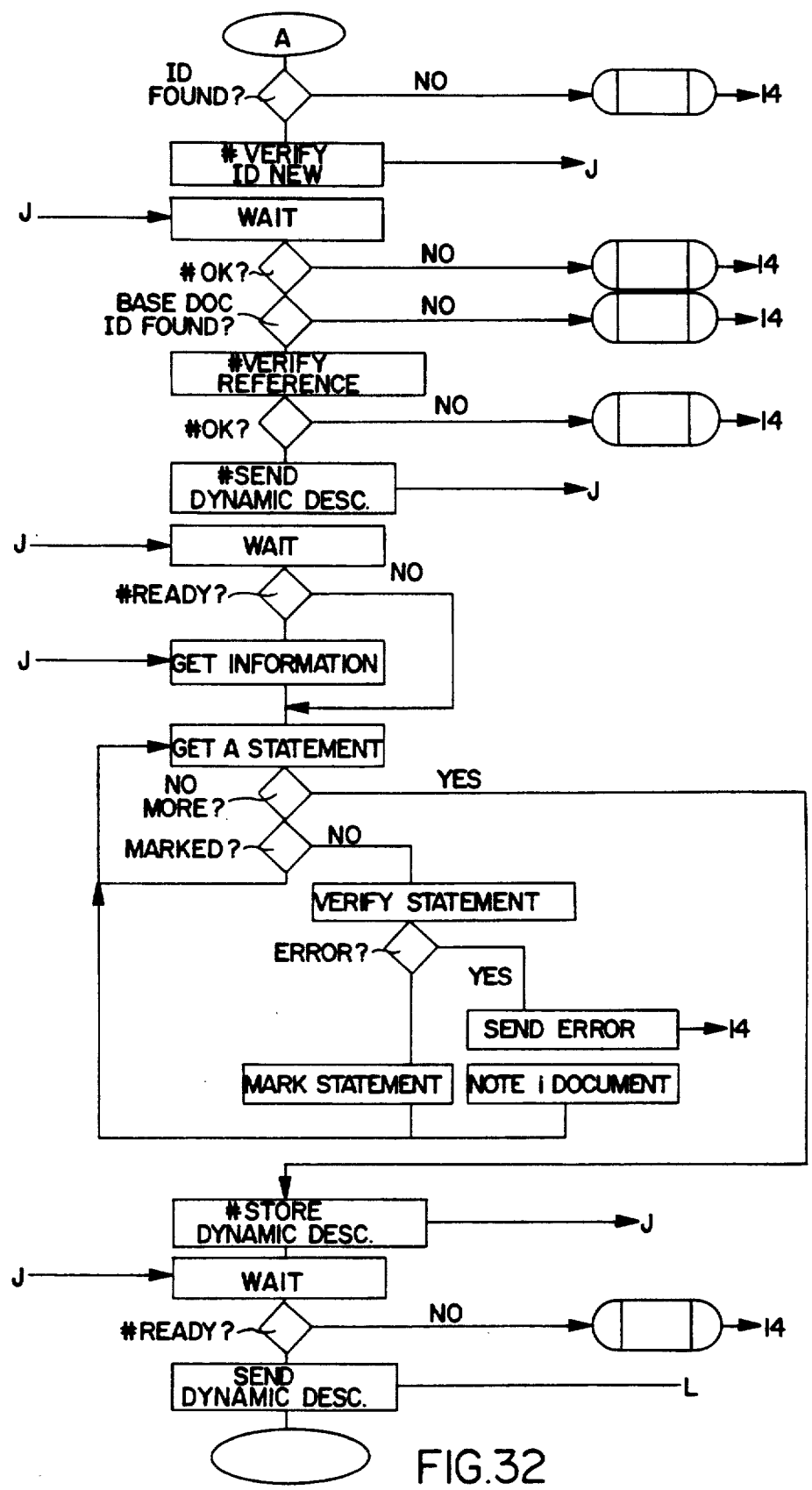

Information Generator
  See FIGS. 18–20.
  Scan input for internal code format notation #DOCTYPE
  if found then
      if type = BASEDOC then
          PROCESSACCEPT
      else
          PROCESSREJECT
  Case Formal specification
  Scan document for identification
  if not found then
      processreject [5]
  else
      request #VERIFY_NEW_ID <identifier> on A
  wait for Control on A
  if Control <> #OK then
      processreject [5]
  Scan document for language specification
  if not found then
      request #DEFAULT SPECLANGUAGE on A
  wait for Control on A
  if Control <> #READY_TO_SEND then
      processreject [5]
  else
      get name on B
      set language name to name
  Request #SEND_INFORMATION LANGUAGE
  <languagename> on A
  wait for Control on A
  if Control <> #READY_TO_SEND then
      processreject [5]
  else
      get rules, definitions and tables on B
  1:
  Get one document statement
  if no more statements then
      goto 2
  if Control then
      interpret statement
      if statement OK then
          transfer it to Control area in base document
      else
          send error on 5
          note in formal specification
          note in base document
      else (if not Control)
              translate statement
              if error then
                  note in formal specification
                  note in base document
                  send error message on 5
              else (if spec. language statement and not error)
                  transfer translation to base document
                  specification area
          goto 1
  Request #STORE FORMALSPEC <identifier> on A
  wait for Control on A
  if Control <> #READY_TO_RECEIVE then
      processreject [5]
  else
      send formal specification on B
      request #STORE BASEDOC <identifier> on A
      wait for Control on A -continued

```
        if Control <> #READY_TO_RECEIVE then
            processreject [5]
        else
            send base document on B
            send base document on C
    Process completed.
Case Base document
Scan Control area for identification
if identification <> current device then
    request #VERIFY_ID_NEW <identifier> on A
    wait for Control on A
    if Control <> #OK then
        processreject [5]
3:
Get one statement from specification area
if no more statements then goto 4
if statement marked then
    goto 3
else
    verify syntax
    if error then
        note in base document
        send error message on 5
    else (if no error)
        mark statement
goto 3
4:
Request #STORE BASEDOC <identifier> on A
wait for Control on A
if Control <> #READY_TO_RECEIVE then
    processreject [5]
else
    send base document on B
    send base document on C
Process completed.
Static description device
See FIGS. 21-24.
Scan document for internal code statement #DOCTYPE
if not found then
    processreject [8]
else
    if document type <> base document then
        if document type <> static description then
            processreject [8]
        else
            PROCESSACCEPT
    else
        PROCESSACCEPT
Get device identifier
if main identifier <> current instance of invention then
    request #VERIFY_ID_NEW <identifier> on D
    wait for Control on D
    if Control <> #OK then
        processreject [8]
Case Base document
If #STATICREF then
    request #SEND_INFORMATION
        STATICDESCRIPTION <reference> on D
    wait for Control on D
    if Control <> #READY_TO_SEND then
        processreject [8]
    else
        get static description on E
else
    request #VERIFY_ID_NEW <identification> on D
    wait for Control on D
    if Control <> #OK then
        processreject and fatal message [8]
1:
Get one statement
if no more statements then
    goto 2
else
    interpret statement
    if error then
        mark static description
        mark base document
        send error on [8]
    else
        remove statement from base document
        insert statement in static description
        goto 1
2:
If new static description then
    construct reference
    insert reference in base document
Request #STORE BASEDOC <identifier> on D
wait for Control on D
if Control <> #READY_TO_RECEIVE then
    processreject [8]
else
    send base document on E
    request #STORE STATICDESCRIPTION
        <identifier> on D
    wait for Control on D
    if Control <> #READY_TO_RECEIVE then
        processreject [8]
    else
        send static description on E
        send base document on F
Process completed.
Case Static description
Get device identification from Control area
if identification <> current instance of invention then
    request #VERIFY_ID_NEW <identifier> on D
    wait for Control on D
    if Control <> #OK then
        processreject [8]
else
    get base document identifier
    if not found then
        processreject and fatal error message [8]
    else
        request #VERIFY_REFERENCE <Basedocid>
            <Static descr. id> on D
        wait for Control on D
        if Control <> #OK then
            processreject and fatal error message [8]
Request #SEND_INFORMATION STATICDESCRIPTION
    <identifier> on D
wait for Control on D
if Control <> #READY_TO_SEND then
    processreject [8]
else
    get static description on E
3:
Get one statement
if no more statements then
    goto 4
if statement marked then
    goto 3
else
    verify statement
    if error then
        note in Static description
        send error message on [8]
    else
        mark statement
        goto 3
4:
Request #STORE STATICDESCRIPTION <identifier> on D
wait for Control on D
if Control <> #READY_TO_RECEIVE then
    processreject [8]
else
    send Static description on E
process completed.
Interface description device.
See FIGS. 25-28.
Scan document for Internal code statement #DOCTYPE
if not found then
    processreject [11]
else
    if document type <> Base document then
        if document type <> Interface description then
            processreject [11]
        else
            PROCESSACCEPT
    else
        PROCESSACCEPT
Get device identifier
if main identifier <> current instance of invention then
    request #VERIFY_ID_NEW <identifier> on G
```

```
            wait for Control on G
            if Control < > #OK then
                processreject [11]
Case Base document
If #INTERFACEREF then
    request #SEND_INFORMATION
    INTERFACEDESCRIPTION <reference> on G
    wait for Control on G
    if Control < > #READY_TO_SEND then
        processreject [11]
    else
        get Interface description on H
    else
        request #VERIFY_ID_NEW <identification> on G
        wait for Control on G
        if Control < > #OK then
            processreject and fatal message [11]
1:
Get one statement
if no more statements then
    goto 2
if statement marked then
    goto 1
else
    interpret statement
    if error then
    mark Interface description
    mark Base document
    send error on [11]
else
    remove statement from Base document
    insert statement in Interface description
goto 1
2:
If new Interface description then
    construct reference
    insert reference in Base document
Request #STORE BASEDOC <identifier> on G
wait for Control on G
if Control < > #READY_TO_RECEIVE then
    processreject [11]
else
    send Base document on H
    request #STORE INTERFACEDESCRIPTION
        <identifier> on G
    wait for Control on G
    if Control < > #READY_TO_RECEIVE Then
        processreject [11]
    else
        send Interface description on H
        send Base document on I
process completed.
case Interface description
Get device identification from Control area
if identification < > current instance of invention then
    request #VERIFY_ID_NEW <identifier> on G
    wait for Control on G
    if Control < > #OK then
        processreject [11]
    else
        get Base document identifier
        if not found then
            processreject and fatal error message [11]
        else
            request #VERIFY_REFERENCE <Basedocid>
                <Interface descr. id> on G
            wait for Control on G
            if Control < > #OK then
                processreject and fatal error message [11]
Request #SEND_INFORMATION
INTERFACEDESCRIPTION <identifier> on G
wait for Control on G
if Control < > #READY_TO_SEND then
    processreject [11]
else
    get Interface description on H
3:
Get one statement
if no more statements then
    goto 4
if statement marked then
    goto 3
else
    verify statement
    if error then
        note in Interface description
        send error message on [11]
    else
        mark statement
    goto 3
4:
Request #STORE INTERFACEDESCRIPTION <identifier>
    on G
wait for Control on G
if Control < > #READY_TO_RECEIVE Then
    processreject [11]
else
    send Static description on H
process completed.
Dynamic description device
See FIGS. 29-32.
Scan document for Internal code statement #DOCTYPE
if not found then
    processreject [14]
else
    if document type < > Base document then
        if document type < > Dynamic description then
            processreject [14]
        else
            PROCESSACCEPT
    else
        PROCESSACCEPT
Get device identifier
if main identifier < > current instance of invention then
    request #VERIFY_ID_NEW <identifier> on J
    wait for Control on J
    if Control < > #OK then
        processreject [14]
case Base document
If #DYNAMICREF then
    request #SEND_INFORMATION
    DYNAMICDESCRIPTION <reference> on J
    wait for Control on J
    if Control < > #READY_TO_SEND Then
        processreject [14]
    else
        get Dynamic description on K
    else
        request #VERIFY_ID_NEW <identification> on J
        wait for Control on J
        if Control < > #OK then
            processreject and fatal message [14]
1:
Get one statement
if no more statements then
    goto 2
if statement marked then
    goto 1
else
    interpret statement
    if error then
        mark Dynamic description
        mark Base document
        send error on [14]
    else
        remove statement from Base document
        insert statement in Dynamic description
    goto 1
2:
If new Dynamic description then
    construct reference
    insert reference in Base document
Request #STORE BASEDOC <identifier> on J
wait for Control on J
if Control < > #READY_TO_RECEIVE then
    processreject [14]
else
    send Base document on K
    request #STORE DYNAMICDESCRIPTION
        <identifier> on J
    wait for Control on J
    if Control < > #READY_TO_RECEIVE then
        processreject [14]
    else
```

Figure 33:
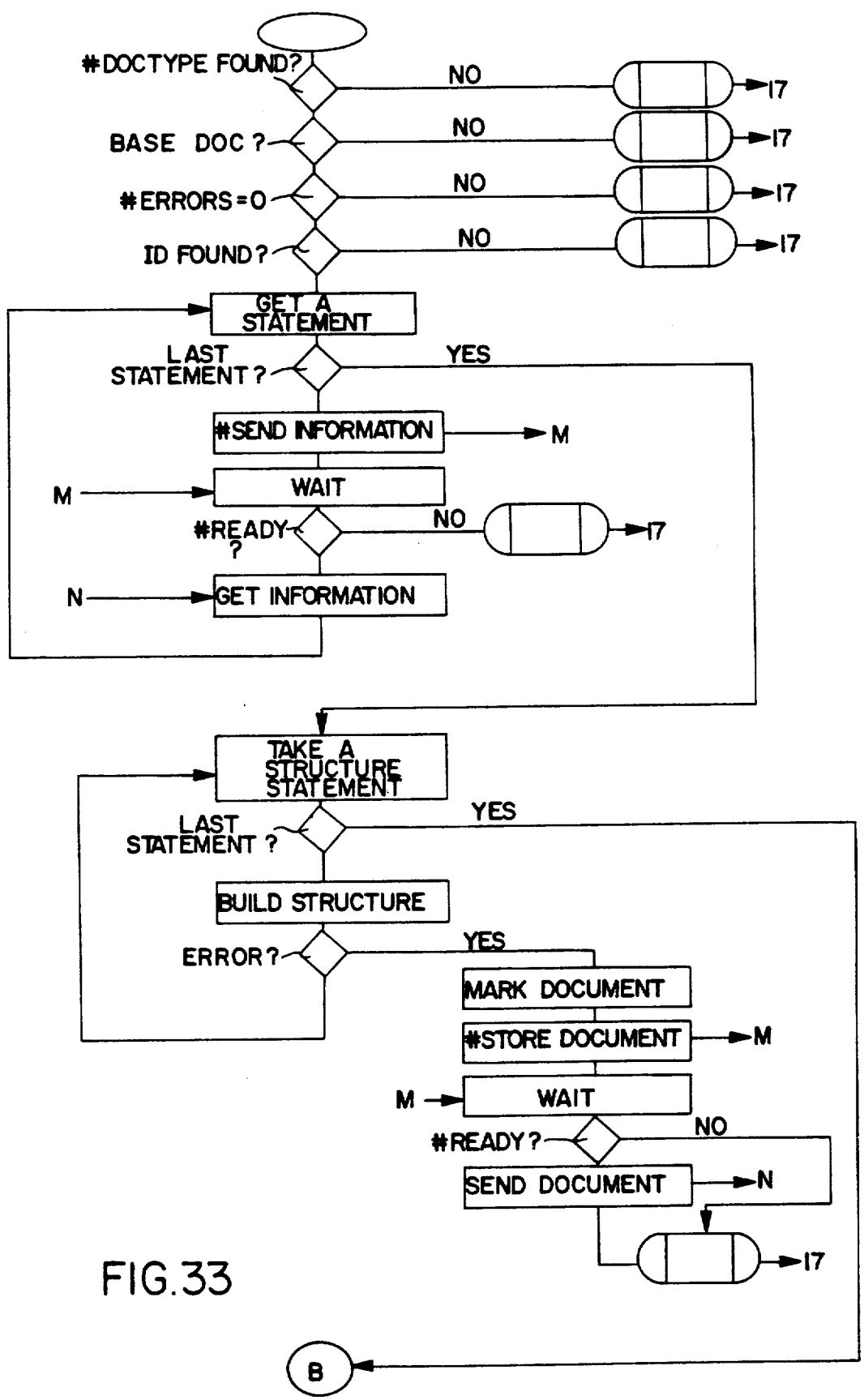
Figure 34:
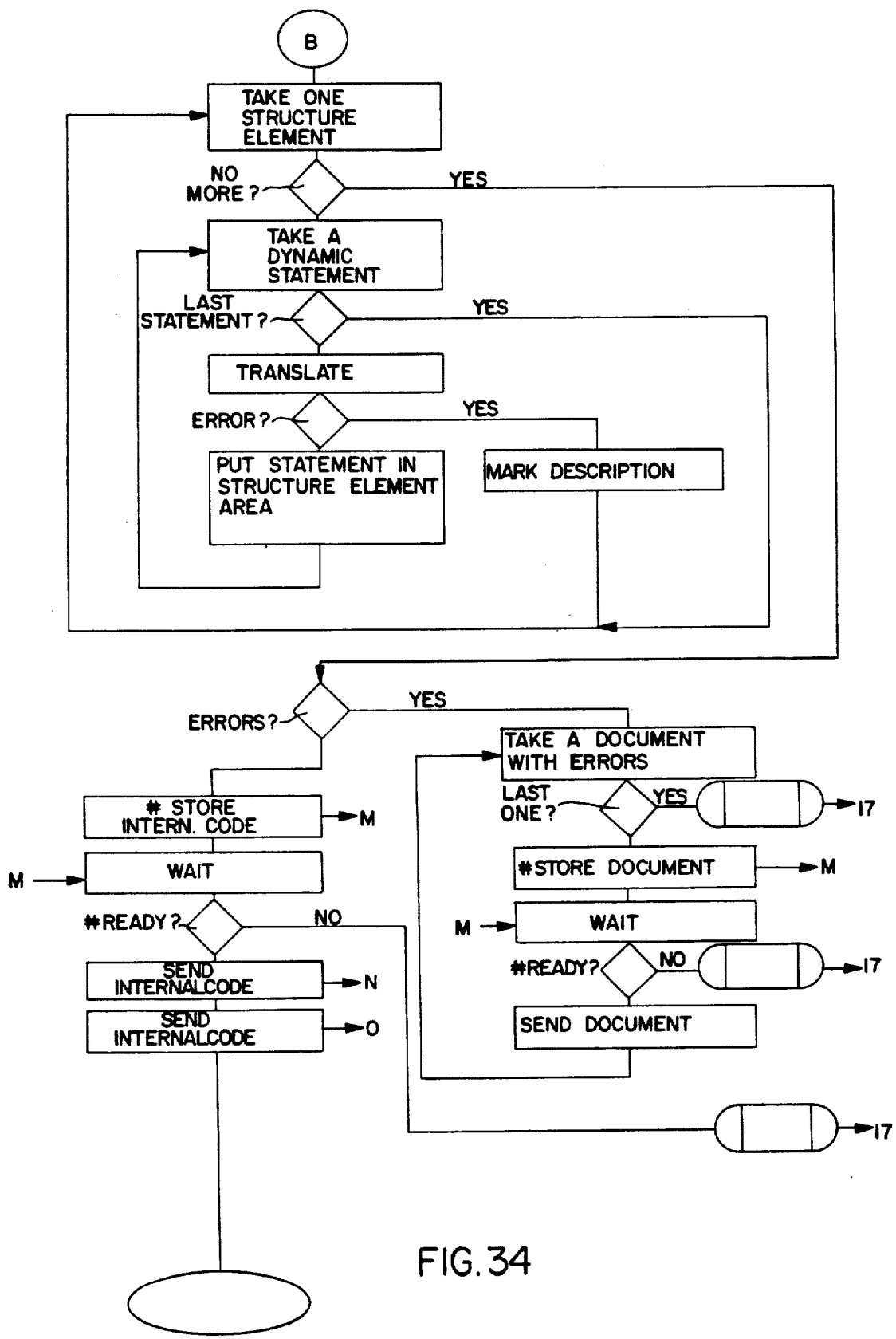

-continued
```
        send Dynamic description on K
        send Base document on L
process completed.
case Dynamic description
Get device identification from Control area
if identification < > current instance of invention then
    request #VERIFY_ID_NEW <identifier> on J
    wait for Control on J
    if Control < > #OK then
        processreject [14]
    else
        get Base document identifier
        if not found then
            processreject and fatal error message [14]
        else
            request #VERIFY REFERENCE <Basedocid>
                <Dynamic descr. id> on J
            wait for Control on J
            if Control < > #OK then
                processreject and fatal error message [14]
Request #SEND_INFORMATION
DYNAMICDESCRIPTION <identifier> on J
wait for Control on J
if Control < > #READY_TO_SEND then
    processreject [14]
else
    get Interface description on
3.:
Get one statement
if no more statements then
    goto 4
if statement marked then
    goto 3
else
    verify statement
    if error then
        note in Dynamic description
        send error message on [14]
    else
        mark statement
    goto 3
4:
Request #STORE DYNAMICDESCRIPTION
<identifier> on J
wait for Control on J
if Control < > #READY_TO_RECEIVE Then
    processreject [14]
else
    send dynamic description on K
    send Base document on L
process completed.
Information processing device
See FIGS. 33-34.
Scan input for Internal code format notation #DOCTYPE
if found then
    if type < > BASEDOC then
        processreject [17]
    else
        if #ERRORS < > 0 then
            processreject [17]
        else
            PROCESSACCEPT
Scan document for identification
if not found then
    processreject [17]
1:
get a statement
if last statement then
    goto 2
else
    request #SEND_INFORMATION REFERENCE
        <identifier> on M
    wait for Control on M
    if control < > #READY_TO_SEND then
        processreject [17]
    else
        get information on N
    goto 1
2:
take a structure statement (static and interface descriptions)
if no more statements then
    if no errors then
```

-continued
```
        goto 3
    else
        processreject [17]
        for erroneous documents do
            request #STORE of erroneous documents on M
            wait for Control on M
            if Control = #READY_TO_RECEIVE then
                send document on N
            else
                send error [17]
            next
build structure using rules, definitions and tables
if error in structure (channels unconnected, unvalid signals, etc.)
then
    send error and fatal message [17]
    mark error in error-containing document (one or more)
else
    goto 2
3:
take a dynamic statement
if no more statements then
    goto 4
else
    translate
    if error then
        send error on [17]
        mark description
        skip rest of that structures dynamic description statements
        goto 3
    else
        put translation in objects (structure related areas) area
        goto 3
If errors in dynamic parts then
    for erroneous documents do
        request #STORE document on M
        wait for Control on M
        if Control = #READY_TO_RECEIVE then
            send document on N
        else
            send error [17]
        next
    else (if no errors in dynamic parts)
        request #STORE INTERNALCODE on M
        wait for Control on M
        if Control < > #READY_TO_RECEIVE then
            send error [17]
        else
            send Internal Code document on N
            send Internal Code document on O
process completed.
Check device.
Scan input for Internal Code format notation #DOCTYPE
if found then
    if type < > INTERNALCODE then
        processreject [19]
    else
        if #ERRORS < > 0 then
            processreject [19]
        else
            processaccept
scan input for #HARDWARESPEC
if not found then
    send error [19]
else
    request #SEND_INFORMATION <identifier> on P
    wait for Control on P
    if Control < > #READY_TO_SEND then
        processreject [19]
    else
        get information on Q
build structure using Internal Code document statements
build dynamic parts using Internal Code document
use estimate rules and instance statements to calculate sizes
if error then
    send error [19]
    while size = to big do
        if instance statement > 1 then
            reduce with 10%
        report new instance statements [19]
    report needed size [19]
for dynamic description verify
    there is a CREATE for instances
```

-continued
```
            there is a DELETE for instances
            OUTPUT signals are
                valid for the channel
                received on the other end of channel
            INPUT signals are
                valid for the channel
                are sent from another function connected to the channel
                ...
                more validations, connected to the symbols
                and their meanings
                ...
            if error then
                send error [19]
                mark document
            else
                request #STORE INTERNALCODE <identifier> on P
                wait for Control on P
                if Control <> #READY_TO_RECEIVE then
                    send error [19]
                else
                    send document on Q
                    send document on R
process completed.
Simulation device
if #NOSIMULATION then
    send Internal Code document on U
else
    get simulation directives
    if directives = #ON_MACHINECODE then
        generate directives for compiling device
        request #STORE INTERNALCODE <identifier> on S
        wait for Control on S
        if Control <> #READY_TO_RECEIVE then
            processreject [22]
        else
            send document on T
            send document on U
    else
        request #SEND INFORMATION
            <simulationoption> on S
        wait for Control on S
        if Control <> #READY_TO_SEND then
            processreject [22]
        else
            get information on T
generate simulation according to rules, definitions and tables
connected to the simulation option.
When simulation finished then
    if information generated then
        request #STORE TESTSEQUENCE <identifier> on S
        wait for Control on S
        if Control <> #READY_TO_RECEIVE then
            processreject [22]
        else
            send document on T
            send document on U
    else
        send document on U
process completed.
Compiling device
scan input for Internal Code statement #DOCTYPE
if found then
    if document type <> Internal Code then
        processreject [26]
    else
        if #ERRORS <> 0 then
            processreject [26]
        else
            processaccept.
scan document for #INTERMEDIATE_LANGUAGE
if not found then
    processreject [26]
else
    request #SEND INFORMATION INTERMEDIATE
        <identifier> on V
    wait for Control on V
    if Control <> #READY_TO_SEND then
        processreject [26]
    else
        get information on X
1:
get a statement
```

-continued
```
if no more statements then goto 2
translate statement
if error then
    mark Intermediate Code
    send error [26]
    goto 1
else
    put translation on Intermediate Code document
    goto 1
2:
Send Intermediate Code document on [25]
check for #COMPILESTATEMENT on
Internal Code document
if found then
    send translation of #COMPILESTATEMENT on [25]
send Internal Code on Y
send Intermediate Code on Y
process completed.
Documentation device
scan input for #DOCUMENT statements
case #FORMAT then
    if identifier then
        request #SEND_INFORMATION FORMAT
            <identifier> on Z
        wait for Control on Z
        if Control <> #READY_TO_SEND then
            send error [29]
        else
            get information on AA
case #SEND then
    request #SEND_INFORMATION
        <received identifier> on Z
    wait for Control on Z
    if Control <> #READY_TO_SEND then
        send Control [29]
    else
        get information on AA
        for all lines do
            format line
            send line on [28]
        next
Case #KEYWORD then
    request #SEND_INFORMATION KEYWORD
        <identifier> on Z
    wait for Control on Z
    if Control <> #READY_TO_SEND then
        send error [29]
    else
        get information
        use information as equivalent to input statements
process completed.
```

EXAMPLE

To exemplify the work of the invention, concentration is made on the handling of logical units in the invention. As stated before this is the chief objective of the invention. For handling of lower levels, the invention depends on the used language in the respects that have been stated earlier.

The examples use a very schematic description. The example system being a telephon exchange, means that in existing reality today, that system is provided with some 1,000,000 to 2,000,000 lines of code in a high level programming language. To use reality on a detailed level as an example, would probably only create confusion.

There are three principally different cases for the invention to handle. These are:

REPLACE, that is, a logical unit is replaced in the system. This means that the logical unit conceptually still performs the same function but does it in a better way in some sense.

ADD, that is a logical unit is added to the system to enable the performance of new services or maybe to make possible the same function carried out in a different way.

REMOVE, that is, a logical unit is removed.

It is very important to keep in mind the fact of the mapping between the language used for specification purposes and the language used as intermediate code. That mapping controles which part of the system that becomes "programs" and which ones become parts of a program, that is, the mapping between these to languages, determines the size of the specification that is possible to use as a seperately executable unit for test and verification purposes.

Figure 35:
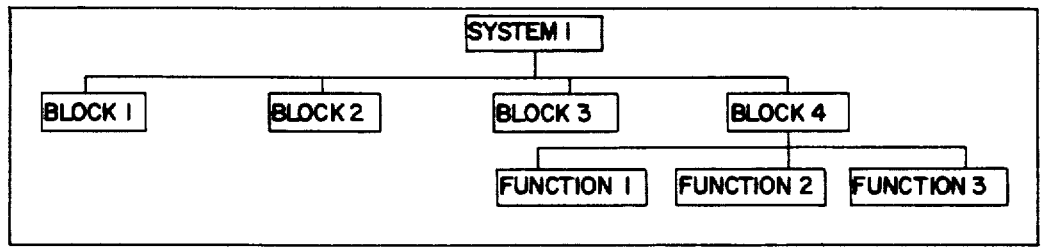
FIGS. 35–38 are useful in explaining exemplary operation of the invention.

The system, used as the example system, can conceptually be described as shown in FIG. 35.

The system, system 1, contains four blocks labelled Blocks 1–4. These blocks all contain a structure of functions, but in our example, only Block 4 is used to describe the work of the invention. This block 4 contains only three functions labelled functions 1-3 and these functions are the ones used to describe the three different principal cases.

Figure 36:
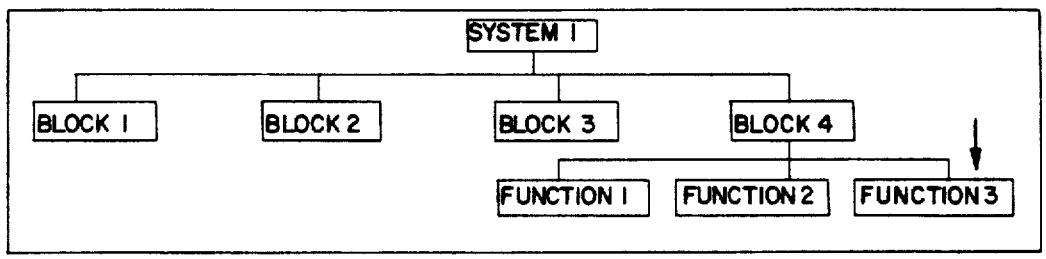

Case 1, replace, see FIG. 36

In the first case, function 3 is to be replaced by an improved version of that function.

Since the invention already contains a description of that function, the simplest way to introduce changes are to change the dynamic document of Function 3. This is made on the device connected to the Dynamic description device in the invention, and when completed, the invention starts processing from that point.

Assuming there is no change in the interface between Function 3 and its environment, this is all that is needed to make the alterations of Function 3 a part of the system.

The invention will start its processing as described before and turn out a new instance of the system in the end, if everything goes well.

As an example of the errors that can occur (disregarding syntactical errors) the checking device could for example turn out a Control output stating:

Partition size to small
Number of specified instances will exceed space in program partition P1
Expansion needed=34.000 bytes
Number of instances in Function 3 is cut from 200 to 150
Do You want to continue?

In this case, our alterations for Function 3 resulted in the code growing so much that the number of instances that we allowed that function to take in the old system, simply will exceed the space available in the telephone exchange for storing executable code. The error is derived from the rules, definitions and tables containing information for one specific machine/operating system combination.

The invention has suggested a way to get around this error by calculating how many instances that could be allowed and have preliminary changed the definition to correspond to the availabe space. The checking device is now waiting for the timeout period for confirmation or rejection of the solution.

In this case the process can be continued in one of two ways: the accept of the correction, or the changing of the hardware. In the case of accept, the process will continue. Otherwise the innovation can output information that could be used as a first input for computer-aided hardware construction if such a format is specified in rules, definitions and tables, in which case these could be used by the Documentation device to output stored information related to hardware and indications of where construction must be altered, in this case the adding of at least 34.000 bytes of storage space in partition P1, an area that has its equivivalent in the hardware description.

To summarize, in this example, changes are made "inside" one dynamic logical unit. If there is a need to keep the knowledge of the old and the new system, this is simplest done by copying the information related to SYSTEM 1 and rename this to SYSTEM 2, in which case (being a part of the static description) the process will start earlier in the process chain of the invention, and turn out a result identified by a new system name.

Figure 37:
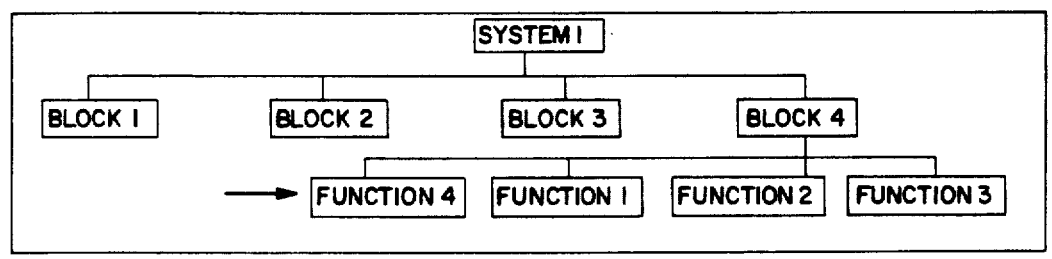

Case 2, adding functions, see FIG. 37

In this second case, there is a need to enlarge the number of services that the system can perform, in this case represented by Function 4 that is to be incorporated with the system in block 4. In this case it is not enough to change a dynamic description since there is no such description of Function 4.

In this case it would be necessary to change in the static description and create a dynamic description for Function 4. This could be done in two ways.

By using the device connected to the Information generator, the alteration in this Base document is requested. The Base document is presented to the user in the form the connected device has the capability to perform, in our case as a graphical syntax, showing symbols as representatives for language statements. Alterations are made to this document by adding Function 4 in the static part, by specifying the new channels needed to communicate with Function 4, and finally the dynamic statements for Function 4 is entered.

In sending back the information to the Information Generator, the invention's process chain is triggered and new (unmarked) parts are translated and verifyed to be in the correct format for Base documents and then passed on to the Static description device. This device will find a statement stating FUNCTION 4 that is a static statement and not a part of the static description before. The static description will be updated with this new statement being a reference to Function 4. The document is then passed on to the interface description device.

This device will find that a number of channels have been added (is unmarked) and will generate an updated version of the interface description for block 4 in which the new signals will be incorporated. The unit will also create a new interface description for a unit that wasn't there before, Function 4, and then pass the document on to the Dynamic description device.

In that device the dynamic parts are extracted and a new document, the dynamic description for Function 4 is generated.

After this point the process are exactly the same as before.

The other possible way to add the function is doing the work step by step using devices connected to the static description device, interface description device and finally the dynamic description device, which will find everything syntactically correct and start the automatic process chain from that point.

Disregarding syntactical errors, the types of errors that could occur could be for instance ambiguities of signals, that is the signal that is unique in the context of the alterers view, could, on a higher level, be ambiguous and have to be changed for exact identification.

As before, a new function could lead to hardware insufficiency and would be handled like the former example.

Figure 38:
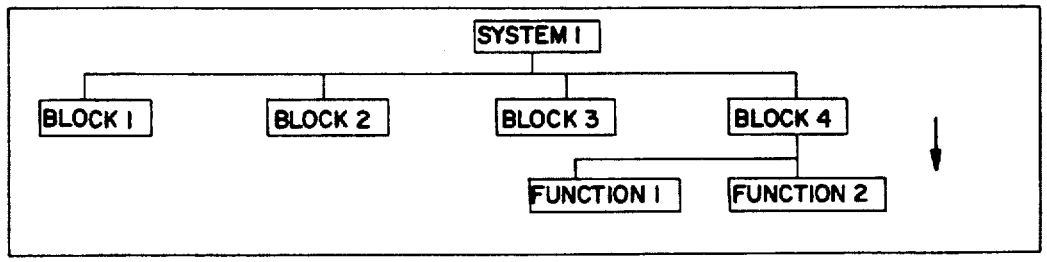

Case 3, removing, see FIG. 38

Removing could be the most difficult case to handle for the invention, depending on the language used. In some languages, the hierarchy and rules, make "calls" very restricted and easy searchable, whereas other specification languages have other structures, making the search of "callers" very extensive and the effect of removed calls totally unpredictable.

When a dynamic description is removed, all references to the dynamic description becomes invalid. That is, it is not enough to simply remove the dynamical description. The static description and interface descriptions have to be altered as well.

The simplest way of doing the operation is not to remove the dynamic description, but rather alter the description (static) of the block where the function is referred to. By doing this, the invention will create errors indicating all the misbehaviours of the system, that is all the other functions using the removed function, all the signals that are only valid if recived by the removed function, etc.

By accepting the alterations (delete of OUTPUT statements, delete of VALIDSIGNAL description, alterations to interface descriptions, etc) the alterations will be made, ensuring a syntactically, and in some cases semantic, validity in the system. However, the actual verification of the new behaviour of the system will have to be validated by the constructors in the simulation of the new system.

After this operation the dynamic description can be removed, possibly saved as documentation somewhere else in the environment, since there is no other reference to it.

What I claim is:

1. Apparatus for generating software suitable for input to a computer which is programmed to control switchings in and operations of a system, the software implementing a new or amended function in the system, comprising:
   a) database means for storage operations and including at least one memory area for global information and at least one memory area for information relating to the specific system only;
   b) information generator means for transforming a formal description representative of the new or amended function in a specification language into a base document, and for sending said base document to the database means;
   c) static description means for extracting parts of the base document to generate a specific static description, the extracted parts of the base document being replaced by references to the static description, and for sending the base document as amended to the database means;
   d) interface description means for extracting parts of the base document to generate an interface description, the extracted parts of the base document being replaced by references to the interface description, and for sending the base document as amended to the data base means;
   e) dynamic description means for extracting parts of the base document to generate a dynamic description, the extracted parts of the base document being replaced by references to the dynamic description, and for sending the base document as amended to the database means;
   f) information processing means for processing the base document as amended by the static, interface, and dynamic description means, respectively, to generate an internal code document containing information needed to generate the software, and for sending the internal code document to the database means;
   g) compiling means for translating the internal code document into a desired language, thereby generating an intermediate code document constituting said software for input to said computer; and
   h) documentation means for generating information on the contents of the data base means in the specified format.

2. Apparatus for generating software suitable for input to a computer which is programmed to control switchings in and operations of a system, the software implementing a new or amended function in the system, comprising:
   a) database means for storage operations and including at least one memory area for global information and at least one memory area for information relating to the specific system only;
   b) information generator means for transforming a formal description representative of the new or amended function in a specification language into a base document, and for sending said base document to the database means;
   c) static description means for extracting parts of the base document to generate a specific static description, the extracted parts of the base document being replaced by references to the static description, and for sending the base document as amended to the database means;
   d) interface description means for extracting parts of the base document to generate an interface description, the extracted parts of the base document being replaced by references to the interface description, and for sending the base document as amended to the data base means;
   e) dynamic description means for extracting parts of the base document to generate a dynamic description, the extracted parts of the base document being replaced by references to the dynamic description, and for sending the base document as amended to the database means;
   f) information processing means for processing the base document as amended by the static, interface, and dynamic description means, respectively, to generate an internal code document containing information needed to generate the software, and for sending the internal code document to the database means;
   g) compiling means for translating the internal code document into a desired language, thereby generating an intermediate code document constituting said software for input to said computer; and
   h) check means for verifying the internal code document in a semantic and syntactical sense.

3. Apparatus according to claim 1 or claim 2, further comprising a simulation means for simulating the system using the internal code document generated by the information processing means, whereby errors are noted and reported and the internal code document is updated.

4. Apparatus according to claim 2 or claim 1, wherein the documentation means provides information suitable for creation of hardware.

5. Apparatus as recited in claim 1 further comprising check means for verifying the internal code document in a semantic and syntactical sense.

6. Apparatus according to claim 2, further comprising a documentation means for generating information on the contents of the database means in a specified format.

* * * * *